United States Patent [19]
Nakase et al.

[11] Patent Number: 5,702,276
[45] Date of Patent: Dec. 30, 1997

[54] WATERCRAFT CATALYTIC EXHAUST SYSTEM

[75] Inventors: Ryoichi Nakase; Shigeyuki Ozawa; Hiroaki Fujimoto; Takehisa Suzuki, all of Hamamatsu, Japan

[73] Assignee: Sanshin Kogyo Kabushiki Kaisha, Hamamatsu, Japan

[21] Appl. No.: 607,800

[22] Filed: Feb. 27, 1996

[30] Foreign Application Priority Data

Feb. 27, 1995 [JP] Japan .................................. 7-038150
Aug. 16, 1995 [JP] Japan .................................. 7-208731

[51] Int. Cl.$^6$ ................................................ B63H 21/32
[52] U.S. Cl. ................................................ 440/89; 114/270
[58] Field of Search ........................... 440/88, 89, 38; 114/270; 181/220, 221, 235; 60/299, 302

[56] References Cited

U.S. PATENT DOCUMENTS

| | | |
|---|---|---|
| 4,664,054 | 5/1987 | Nishida . |
| 4,773,883 | 9/1988 | Nakase et al. . |
| 4,811,560 | 3/1989 | Nakase et al. . |
| 4,900,282 | 2/1990 | Takahashi et al. .......................... 440/89 |
| 4,982,682 | 1/1991 | Hattori . |
| 4,989,409 | 2/1991 | Nakase et al. . |
| 4,997,399 | 3/1991 | Nakayasu et al. . |
| 5,067,448 | 11/1991 | Nakase et al. . |
| 5,096,446 | 3/1992 | Tazaki et al. . |
| 5,234,364 | 8/1993 | Ito . |
| 5,251,439 | 10/1993 | Nakase et al. . |
| 5,324,217 | 6/1994 | Mineo . |
| 5,366,401 | 11/1994 | Nanami et al. . |

*Primary Examiner*—Stephen Avila
*Attorney, Agent, or Firm*—Knobbe, Martens, Olson & Bear, LLP

[57] ABSTRACT

A number of embodiments of a personal watercraft are disclosed which have a catalytic exhaust system for treating and purifying exhaust gases. In all of the embodiments, the catalyst is positioned and disposed so as to be protected from water. In addition, arrangements are provided for cooling the catalyst, for discharging at least a portion of coolant upstream of the catalyst, for circulating ventilating air across it, for isolating it from other components such as the fuel tank, and for permitting its flushing with fresh water after operating in a salt water environment.

24 Claims, 21 Drawing Sheets

WATERCRAFT CATALYTIC EXHAUST SYSTEM

BACKGROUND OF THE INVENTION

1. Field of the Invention

This invention relates to an exhaust system for a personal watercraft and more particularly to a catalytic exhaust system for such watercraft. The present catalytic exhaust system is, at least in several embodiments, substantially similar to the watercraft catalytic exhaust system disclosed in co-pending application Ser. No. 08/484,953, filed Jun. 7, 1995, in the names of Ryoichi Nakase, Shigewuki Ozawa, and Hiroaki Fujimoto, and assigned to the assignee hereof, which is hereby incorporated by reference.

2. Description of Related Art

There is a very popular and growing segment of the watercraft market for a type of watercraft called a "personal watercraft." This type of watercraft is comprised of a relatively small hull that defines a rider's area which is designed primarily to accommodate a rider and possibly one or two additional passengers. This type of watercraft is generally quite sporting in nature, and the watercraft may at times become inverted or at least partially capsized. In addition, it is frequently the situation that the rider and/or passengers may enter the watercraft from the body of water in which the watercraft is operating. Therefore, it is common for the rider and passengers to wear swimming suits when operating this type of watercraft.

Frequently, this type of watercraft is powered by a jet propulsion unit which is mounted in a tunnel to the underside of the hull, and thus the watercraft provides a very neat and compact appearance. The propulsion unit is frequently a two-cycle internal combustion engine because of the small size and high output of these engines.

As is well known with many types of watercraft, the exhaust gases from the watercraft engine are discharged to the atmosphere either through or close to the body of water in which the watercraft is operating. Thus, environmental concerns raise a desire to ensure that the exhaust gases are relatively clean so as to avoid pollution of not only the atmosphere, but also of the water body. These problems are particularly acute in connection with two-cycle engines because of the fact that frequently the exhaust products contain lubricant and other hydrocarbons.

It is, therefore, a principal object of this invention to provide an improved exhaust system for this type of watercraft.

It is a further object of this invention to provide an exhaust system for a personal watercraft wherein a catalyst is provided in the exhaust system for treating the exhaust gases and removing objectionable exhaust gas constituents.

From the foregoing description it should be readily apparent that the sporting nature of this type of watercraft means that water can, from time to time, enter the exhaust system. This is particularly true when the watercraft is operating with its discharge either at or below the water level. The problem becomes particularly acute in the event the watercraft becomes inverted and is subsequently righted.

As is well known, catalysts operate at a relatively high temperature in order to become efficient. If a large body of water is permitted to come into contact with the catalyst, for example, during the capsizing and righting operation aforenoted, the catalyst bed may become shattered. Even if the bed does not shatter, the water contacting it may cause pollution of the catalyst, particularly when operating in marine environments.

It is a further object of this invention to provide an improved catalytic exhaust system for a personal watercraft wherein the catalyst is positioned so that it will be protected from damage by water.

In addition to the problems of possible water damage or water contamination, the temperature at which the catalyst operates makes it desirable to ensure some arrangement for protecting the surrounding environment in the hull from the heat of the catalyst. This is particularly important with small personal watercraft because of the fact that the engine compartment is relatively small and also because of the fact that the size of the watercraft requires the various components and auxiliaries to be placed close to each other.

It is, therefore, a still further object of this invention to provide an improved arrangement for protecting the surroundings in a personal watercraft from the heat of a catalyst in its exhaust system.

Frequently, it is the practice to encircle at least a portion of the exhaust system such as the exhaust manifold and/or expansion chamber with a cooling jacket through which engine coolant is circulated. This helps not only to silence the exhaust gases, but also to offer protection to the surrounding environment. The water which has passed through the cooling jacket is then generally dumped back into the exhaust system so as to further cool it and to assist in its discharge back to the body of water in which the watercraft is operating. This added water to the exhaust system gives a rise to possible damage to the catalyst, for reasons noted above.

It is, therefore, a still further object of this invention to provide an improved exhaust system for a personal watercraft wherein the exhaust system is provided with a cooling jacket and water is returned from this cooling jacket to the exhaust system but in a way so as to protect a catalyst in the exhaust system from damage.

It is a further object of this invention to provide an improved catalytic exhaust system for a personal watercraft wherein the catalyst is positioned in such a way that it can be easily cooled.

It is a still further object of this invention to provide an improved catalytic exhaust system for a personal watercraft wherein the catalyst is disposed so that it is spaced from other components or auxiliaries of the engine which might be prone to damage from heat.

As has been previously noted, one problem attendant with the provision of catalytic exhaust systems for personal watercraft is the danger of water damage. As has been previously noted, this type of watercraft may become inverted or partially capsized, and upon this condition or upon subsequent righting there is a danger that the water may come into contact with the catalyst.

It is, therefore, a still further object of this invention to provide an improved catalytic exhaust system for a personal watercraft wherein the catalyst and exhaust system is arranged in such a way that the catalyst will always be at a high point, regardless of the orientation of the watercraft, so as to reduce the likelihood of water reaching it.

Although it is desirable to protect the catalyst from contact with water when the engine is running, there may be sometimes when it is desirable to be able to flush the catalyst bed with clear water for cleaning purposes. That is, although the catalyst should not contact the water when the catalyst is at a high temperature and the water is at a lower temperature, there may be containments that are deposited on the catalyst bed. It may be desirable to employ a water flushing arrangement for clearing these contaminants from the catalyst bed.

For example, if the watercraft is operating in a marine environment, the presence of water or water vapor in the exhaust system can give rise to the condensation or deposition of the water born contaminants such as salt on the catalyst bed. Once the watercraft is taken out of operation, it may be desirable to have an arrangement wherein the catalyst bed may be flushed with pure water to remove these deposited contaminants.

It is, therefore, a still further object of this invention to provide an improved arrangement for flushing the catalyst in a watercraft exhaust system.

SUMMARY OF THE INVENTION

An aspect of the present invention involves a personal watercraft comprising a hull. The hull defines a rider's area which is sized to accommodate at least one rider. The hull also defines an engine compartment which contains an internal combustion engine. The engine has at least one exhaust port and an output shaft. The output shaft drives a propulsion device carried by the hull. An exhaust system communicates with the engine exhaust port and delivers exhaust gases to the atmosphere. A water jacket juxtaposes at least a portion of the exhaust system and communicates with a cooling system of the engine. Coolant from the engine flows into the cooling jacket. A catalyzer lies within the exhaust system and includes a catalyst bed. The catalyst bed treats the exhaust gases before discharge to the atmosphere. The cooling jacket includes an outlet port which is positioned upstream of the exhaust stream from the catalyst bed. At least a portion of the coolant flowing through the cooling jacket flows through the outlet port.

In accordance with another aspect of the present invention, a personal watercraft is provided having a hull define a rider's area. The rider's area is sized to accommodate at least one rider. The hull also defines an engine compartment between a plurality of floatations. The engine compartment contains an internal combustion engine. The engine has at least one exhaust port and an output shaft. A propulsion device for propelling the watercraft is carried by the hull and is driven by the engine. An exhaust system conveys exhaust gases from the engine outlet port to the atmosphere. A catalyst is positioned in the exhaust system to treat the exhaust gases before discharge. The catalyst is positioned within the hull so as to lie above a water level relative to the watercraft with the engine compartment filled with water from the body of water in which the watercraft is operated.

An additional feature of this invention is adapted to be embodied in a personal watercraft having a hull that defines a rider's area that is sized to accommodate at least one rider and which is configured and arranged so that a rider may easily enter the rider's area from the body of water in which the watercraft is operating. The hull defines an engine compartment that contains an internal combustion engine having at least one exhaust port and an output shaft. A propulsion device is carried by the hull and is driven by the engine output shaft for propelling the watercraft. An exhaust system conveys exhaust gases from the engine exhaust port to the atmosphere at a position contiguous to the water level. A catalyst is provided in the exhaust system for treating the exhaust gases before discharge to the atmosphere.

Another feature of the invention is also adapted to be embodied in a personal watercraft having a hull that defines a rider's area which is sized to accommodate at least one rider. The hull defines an engine compartment that contains an internal combustion engine having at least one exhaust port and an output shaft. A propulsion device is carried by the hull in an under portion thereof and which is driven by the engine output shaft for propelling the watercraft. An exhaust system is provided for conveying exhaust gases from the engine exhaust port to the atmosphere at a point contiguous to the water level when the watercraft is operating in a body of water. A catalyst is positioned in the exhaust system for treating the exhaust gases before discharge to the atmosphere. A water trap device is disposed in the exhaust system for trapping water which may tend to flow to the catalyst from the exhaust outlet.

Another feature of the invention is adapted to be embodied in a personal watercraft having a hull defining a rider's area that is sized to accommodate at least one rider. The hull defines an engine compartment that contains an internal combustion engine having at least one exhaust port for discharging exhaust gases and an induction system having an induction system air inlet. The engine also has an output shaft. This output shaft drives a propulsion device that is carried by the hull on the underside thereof for propelling the watercraft. An exhaust system conveys exhaust gases from the engine exhaust port to the atmosphere at a point contiguous to the water level when the watercraft is operating in a body of water. A catalyst is positioned in the exhaust system for treating the exhaust gases before discharge to the atmosphere. This catalyst is disposed above both the induction system air inlet and the exhaust port.

A still further feature of the invention is also adapted to be embodied in a personal watercraft that has a hull defining a rider's area that is sized to accommodate at least one rider. The hull defines an engine compartment containing an internal combustion engine and having at least one exhaust port and an output shaft. A propulsion device is carried by the hull and is driven by the engine output shaft for propelling the watercraft. A ventilating system is provided for circulating ventilating air through the engine compartment. An exhaust system is provided for conveying exhaust gases from the engine exhaust port to the atmosphere. A catalyst is positioned in the exhaust system for treating the exhaust gases before discharge to the atmosphere. This catalyst is disposed so that it will be in the path of the ventilating air flow through the engine compartment.

A still further feature of the invention is also adapted to be embodied in a personal watercraft having a hull that defines a rider area that is sized to accommodate at least one rider. The hull defines an engine compartment that contains an internal combustion engine which has at least one exhaust port and an output shaft. A propulsion device is carried by the hull and is driven by the engine output shaft for propelling the watercraft. An exhaust system is provided for conveying exhaust gases from the engine exhaust port to the atmosphere at a point contiguous to the water level when the watercraft is floating in a body of water. A catalyst is disposed in the exhaust system for treating the exhaust gases before their discharge to the atmosphere. This catalyst is disposed in a location so that it will be above the water level at any time the watercraft is floating in a body of water and regardless of the orientation at which the watercraft is floating be it erect or inverted.

Yet another feature of the invention is adapted to be embodied in a watercraft having a hull that defines a rider's area for accommodating at least one rider. The hull defines an engine compartment that contains an internal combustion engine which has at least one exhaust port and an output shaft. A propulsion device is carried by the hull and is driven by the engine output shaft for propelling the watercraft. An exhaust system is providing for conveying exhaust gases from the exhaust port to the atmosphere. A catalyst is disposed in the exhaust system for treating the exhaust gases before their discharge to the atmosphere. A flushing port is positioned in the exhaust system contiguous to the catalyst so that the catalyst bed may be flushed with pure water when the watercraft is not being operated.

BRIEF DESCRIPTION OF THE DRAWINGS

These and other features of the invention will now be described with reference to the drawings of a preferred embodiment which is intended to illustrate and not to limit the invention, and in which.

DETAILED DESCRIPTION OF THE PREFERRED EMBODIMENTS OF THE INVENTION

Figure 1:
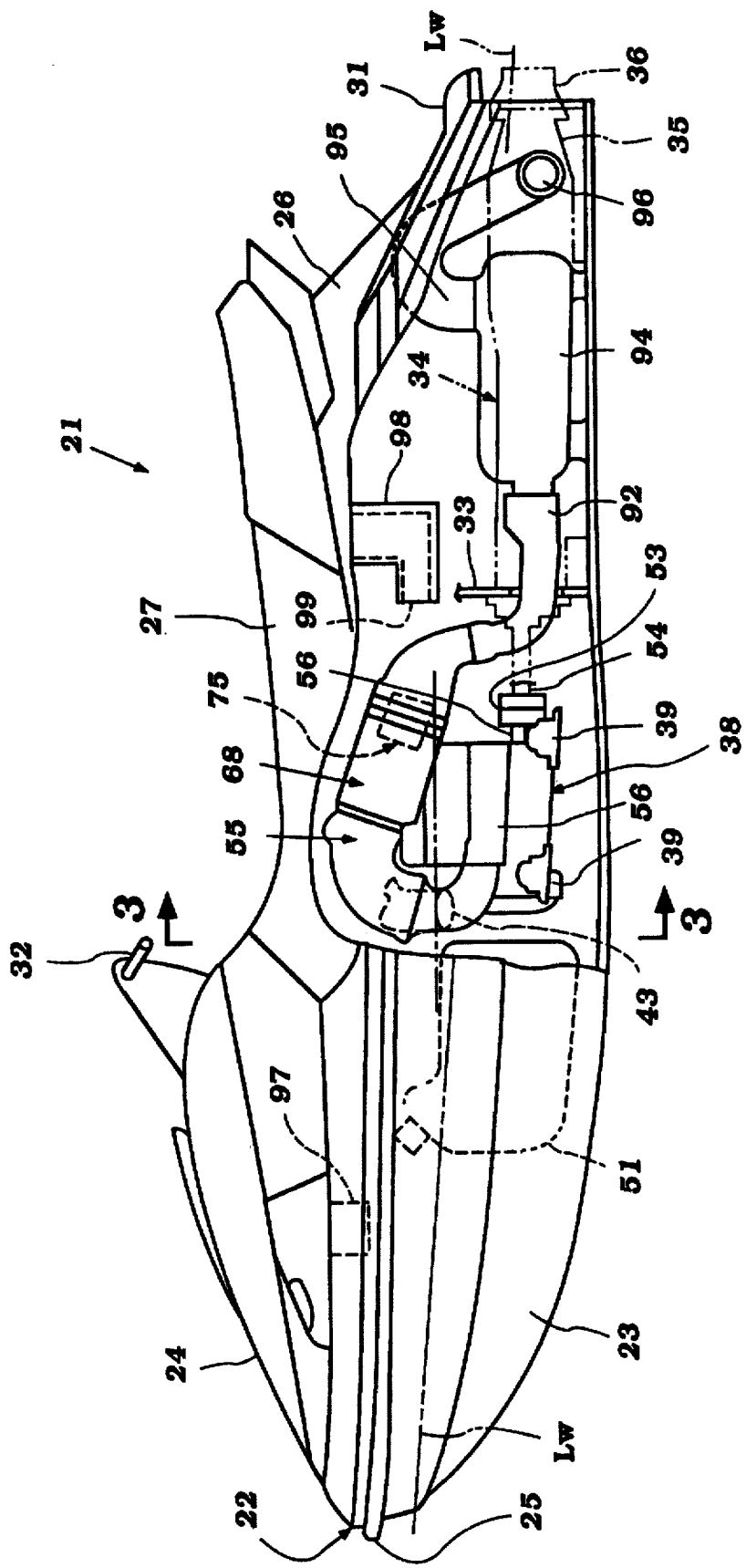
FIG. 1 is a side elevational view, with a portion broken away, of a personal watercraft constructed in accordance with a first embodiment of the invention.
Figure 2:
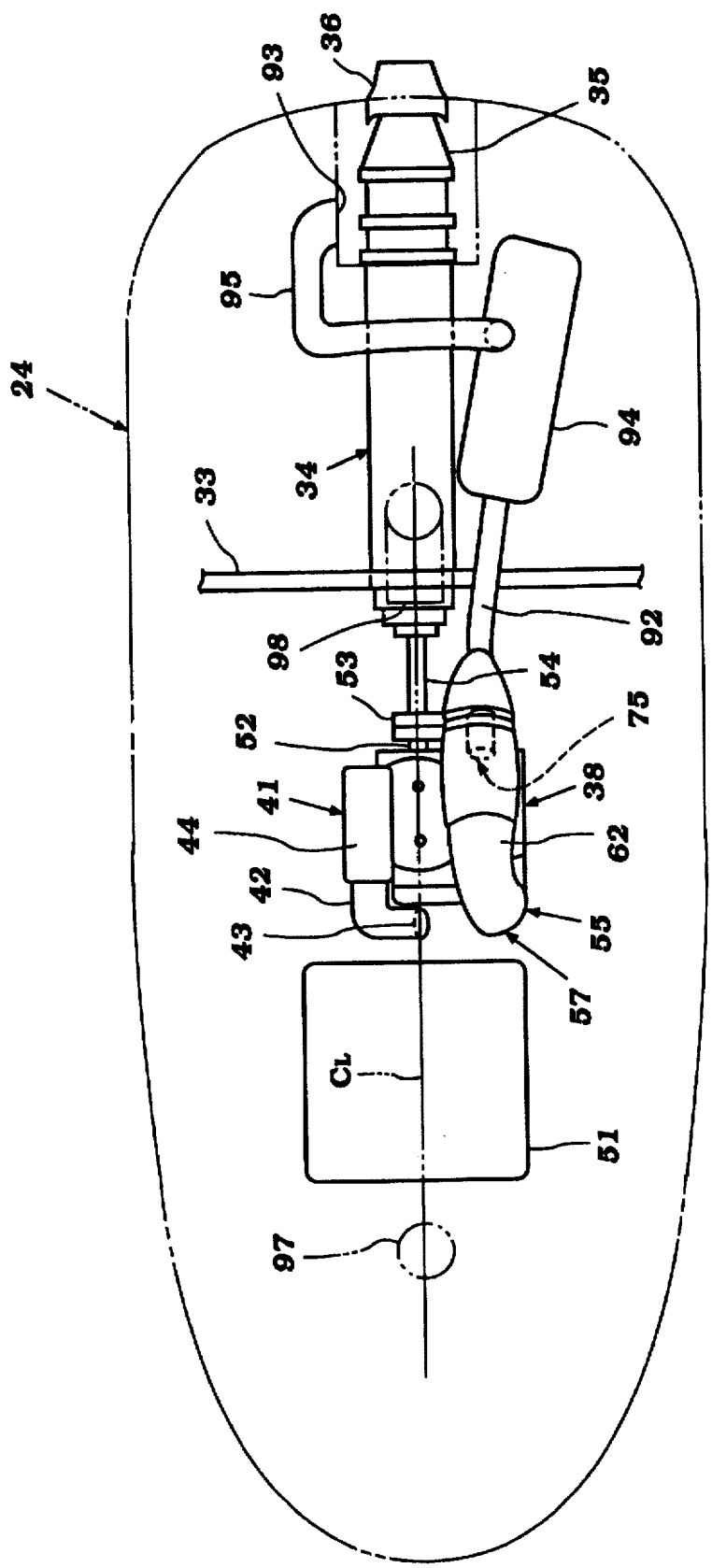
FIG. 2 is a top plan view of the watercraft with the hull shown in phantom, except for the bulk head that defines the forward end of the tunnel in which the propulsion unit is contained so as to show the orientation of the engine, its auxiliaries, and the propulsion system.
Figure 3:
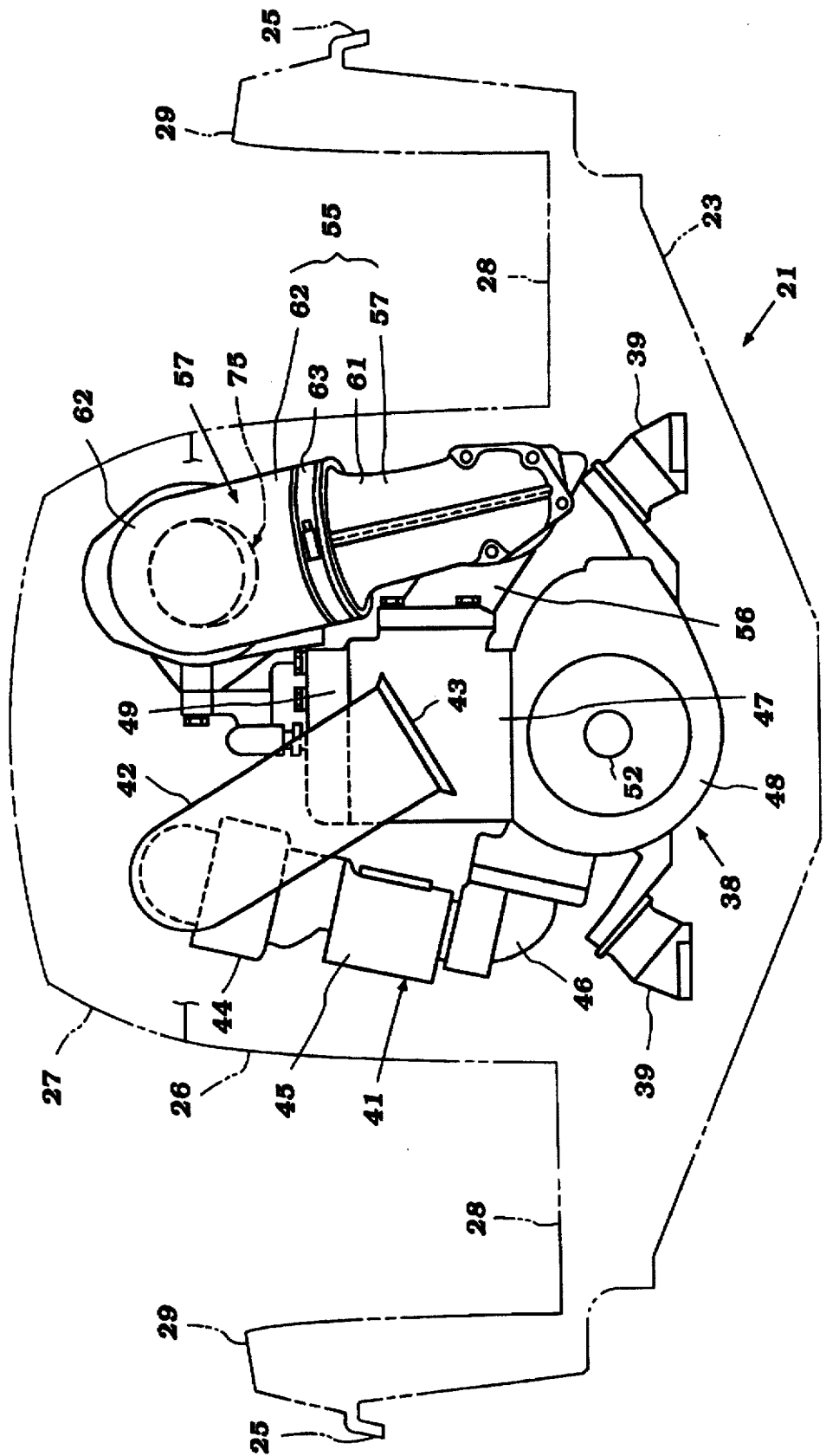
FIG. 3 is an enlarged cross-sectional view taken along The line 3—3 of FIG. 1, but shows the hull in phantom.

Referring now in detail to the drawings and initially to the embodiment of FIGS. 1–5 and initially primarily to FIGS. 1–3 thereof, a small personal watercraft constructed in accordance with this embodiment is identified generally by the reference numeral 21. The small watercraft 21 is of the type known as a personal-type watercraft and is designed so as to be operated by a single rider and may accommodate one or more passengers. Primarily, the watercraft 21 is configured and particularly its passenger area, as will be described, so that the watercraft can be easily boarded from the body of water in which it is operated. The actual configuration of the watercraft 21 may vary, and the various embodiments show certain examples of configurations which may be employed. Of course, those skilled in the art will readily understand how the invention can be practiced with a wide variety of types of watercraft, and particularly personal watercraft.

The watercraft 21 is comprised of a hull, indicated generally by the reference numeral 22, which is made up primarily of a lower hull portion 23 and an upper deck portion 24. The portions 23 and 24 are formed from a suitable material such as a molded fiberglass reinforced resin or the like and are connected to each other in any manner known in this art. Normally, the connection is provided at an outstanding flange or gunnel 25 which extends around the peripheral edge of the hull 22.

The rearward portion of the hull 22 defines a rider's area. A raised pedestal 26 is provided in this rider's area upon which a seat cushion 27 is supported. As may be seen best in FIG. 3, the area on the sides of the pedestal 26 are provided with foot areas 28 on which riders seated in straddle fashion on the seat 27 may place their feet. In the particular configuration shown in this embodiment, the seat 27 has a length so that it can accommodate the rider/operator and one or two additional passengers.

The outer sides of the foot areas 28 are bounded by raised gunnels 29. Thus, the riders are protected at the sides by these gunnels 29. However, the rear of the foot areas 28 open through the rear of the transom of the watercraft so as to facilitate boarding of the watercraft from the rear. In fact, the raised pedestal 25 is disposed forwardly of the rear end of the hull so as to define a rear deck 31 (FIG. 1) upon which boarding may be made.

The area of the deck 24 forwardly of the seat 27 is provided with a control mast 32 which can be employed for steering of the watercraft in a manner which will be described. In addition, other watercraft controls may be carried by the mast 32; for example, a throttle control.

The portions 23 and 24 of the hull 22 define a compartment. This compartment serves at least in part as an engine compartment and extends at least in part beneath the seat 27 and terminates at its rear end in a bulk head 33. A jet propulsion unit 34 is mounted within a tunnel that is formed in the underside of the hull portion 23 rearwardly of the bulk head 33. As is typical, this jet propulsion unit 34 is comprised of a water inlet opening which draws water from an opening formed in the underside of the hull portion 23 or in the jet propulsion unit 34 itself via the action of an impeller. The impeller in turn discharges the water rearwardly past straightening vanes to a discharge nozzle portion 35 upon which a steering nozzle 36 is mounted. The steering nozzle 36 is coupled to the mast 32 for its steering about a vertically extending steering axis so as to control the direction of travel of the watercraft. Since the construction of the jet propulsion unit 34 itself forms no part of the invention, it will not be described further. Reference may be had to any of the numerous known prior art devices for the construction which it may take.

Mounted within the engine compartment forwardly of the bulk head 33 and primarily beneath the forward portion of the seat 27 is an internal combustion engine, indicated generally by the reference numeral 38. The engine 38 may be of any known type and is illustrated in the various embodiments as being of a two-cylinder in-line type operating on a two-stroke crankcase compression principle. It is to be understood that this type of engine is just typical of those with which the invention may be utilized. Those skilled in the art will understand how the invention can be employed with engines having various cylinder numbers and cylinder orientations. The invention also can be utilized in conjunction with four-cycle engines, but it does have particular utility with two-cycle engines because of the unique emission control problems which they present.

The engine 38 is mounted in the hull portion 23 on engine mounts 39 in a manner that is well known in this art. The engine 38 is provided with an induction system which is indicated generally by the reference numeral 41 and which is disposed at one side of the engine on one side of longitudinally extending center plane CL, which appears in FIG. 2 and certain other figures. This induction system includes an air inlet device 42 which has a generally angular configuration and which forms a downwardly opening air inlet portion 43 which is disposed at the front of the engine 38 within the engine compartment.

The air inlet device 42 supplies air to a plenum chamber 44 which extends along the inlet side of the engine 38 and which delivers the air inducted to charge formers in the form of carburetors 45. The carburetors 45 in turn deliver the fuel-air charge which they form to an intake manifold 46 that is mounted to a side of a crankcase chamber formed by a cylinder block 47 of the engine and a crankcase member 48 that is affixed to it.

As is well known in two-cycle engine practice, the crankcase chambers of the engine 38 are sealed from each other and communicate with the combustion chamber of the engine defined by the cylinder bores, pistons, and cylinder heads 49 affixed to the cylinder block 47 through scavenge passages. Since the internal details of the engine 38 may be of any conventional type, a further description of the actual engine construction is not believed to be necessary to permit those skilled in the art to understand and practice the invention.

A fuel tank 51 is positioned in the engine compartment forwardly of the engine so that it lies on the longitudinal centerline CL. This fuel tank 51 supplies fuel to the charge formers or carburetors 45 in any known manner.

The engine 38 includes an output shaft 52, such as a crankshaft, which is journaled within the aforenoted crankcase chamber in any known manner and which extends rearwardly through the end of the engine. A coupling 53 interconnects this engine output shaft 52 with an impeller shaft 54 that extends rearwardly into the jet propulsion unit 34. The impeller shaft 54 is coupled to the aforenoted impeller in a known manner. Again, this particular detail of the construction of the watercraft 21 is not necessary to understand the construction or operation of the invention. Any conventional structure may be employed.

Figure 4:
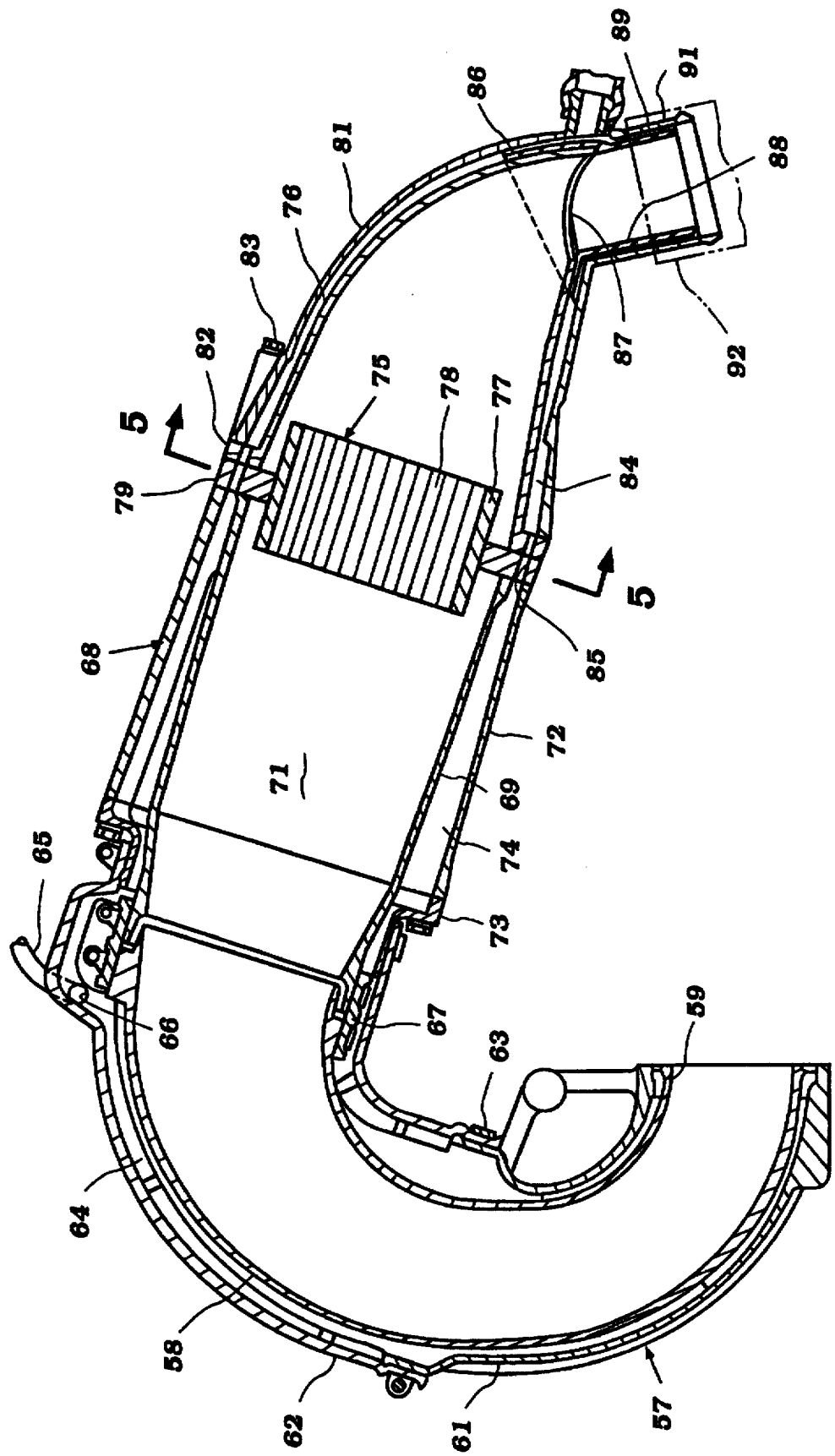
FIG. 4 is an enlarged cross-sectional view taken through the exhaust expansion chamber device of this embodiment.
Figure 5:
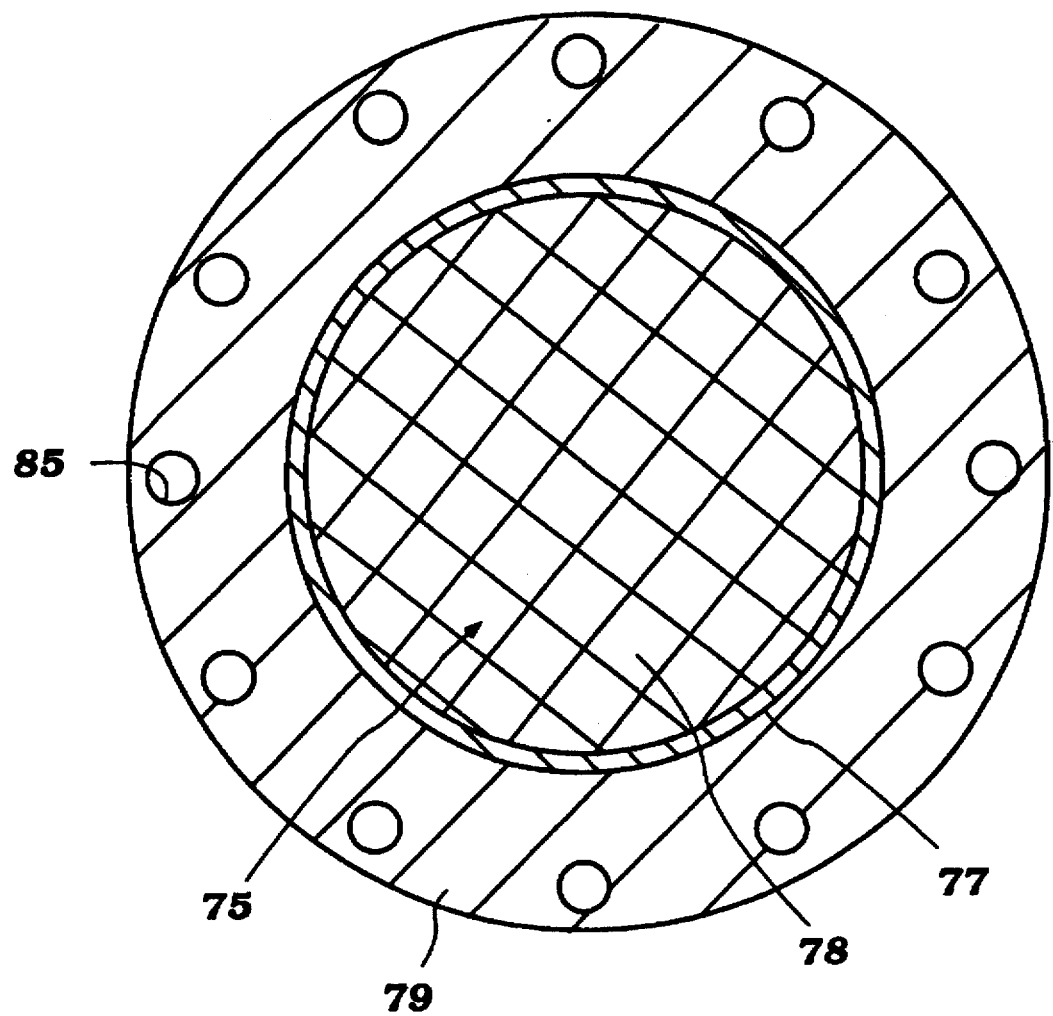
FIG. 5 is a further enlarged cross-sectional view taken along the line 5—5 of FIG. 4 and shows the catalyst bed and its support.
Figure 6:
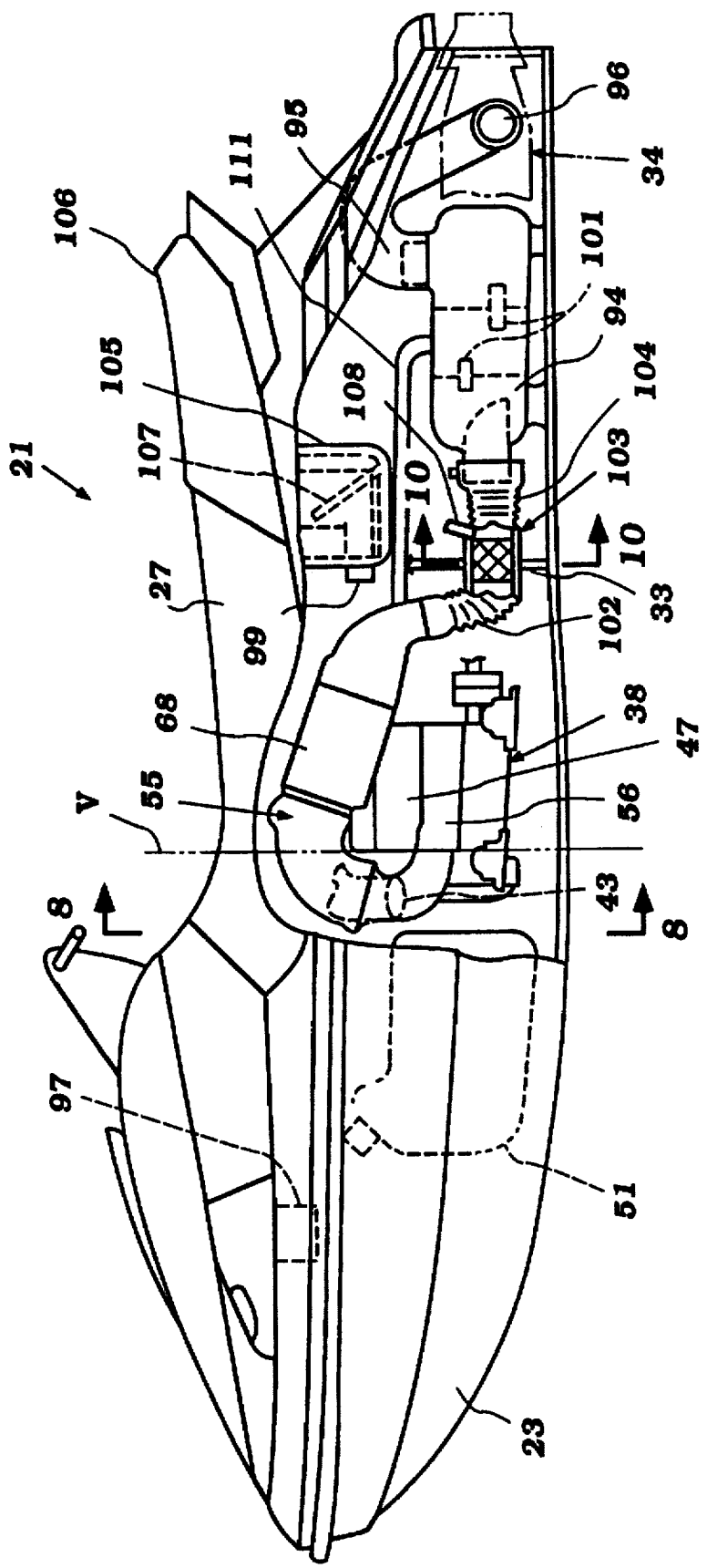
FIG. 6 is a side elevational view, with a portion broken away, in part similar to FIG. 1 and shows another embodiment of the invention.
Figure 7:
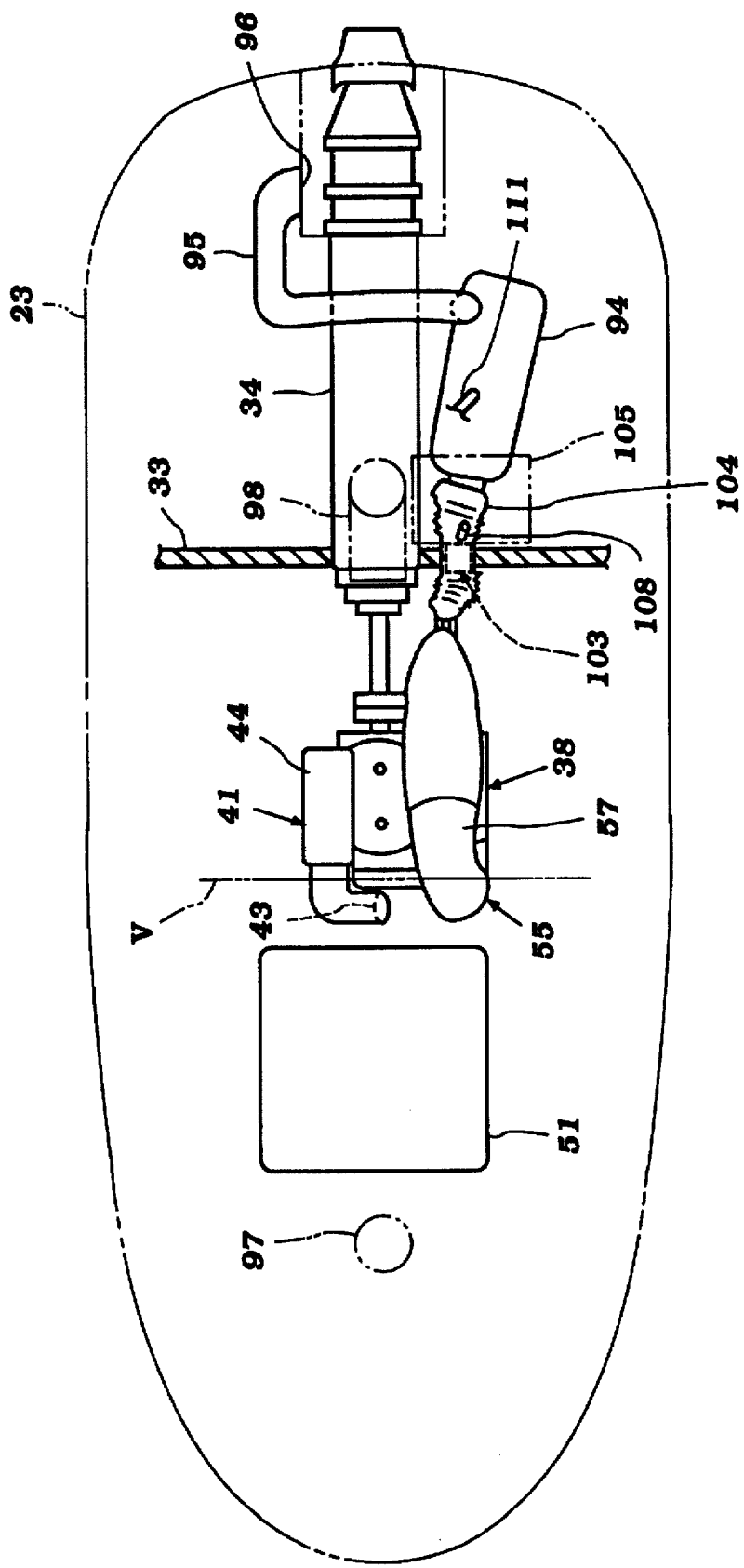
FIG. 7 is a top plan view, in part similar to FIG. 2, but shows this embodiment in a similar manner.
Figure 8:
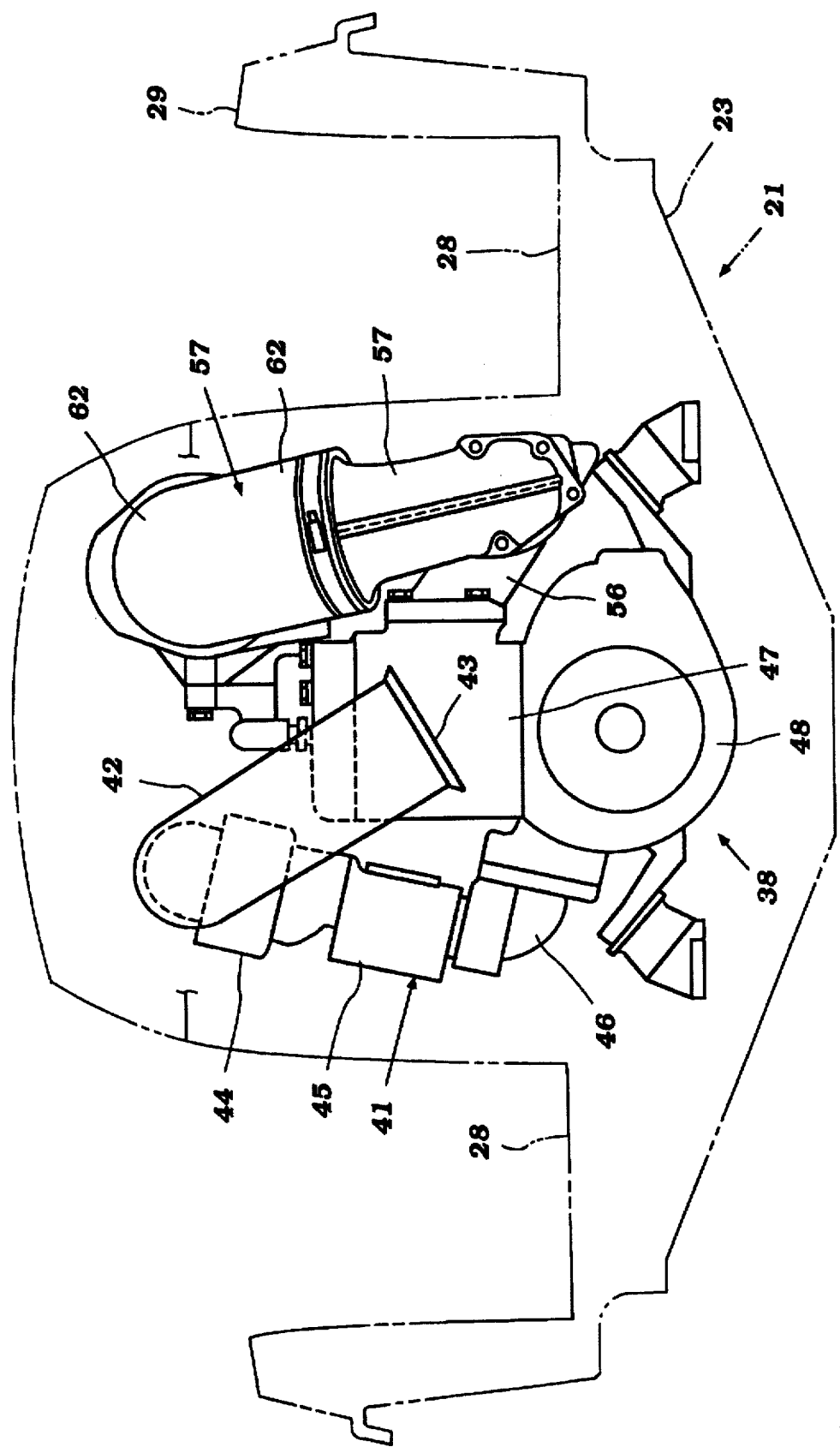
FIG. 8 is a cross-sectional view, in part similar to FIG. 3, but taken along the line 8—8 of FIG. 6.

The exhaust products from the engine 48 are discharged to the atmosphere through an exhaust system, indicated generally by the reference numeral 55, and which will be described by primary reference to all figures of this embodiment. This exhaust system 55 includes an exhaust manifold 56 that is affixed to the side of the cylinder block 47 and which receives the exhaust gases therefrom through exhaust ports in a well-known manner. This exhaust manifold 56 terminates in a forwardly disposed discharge portion that connects with a C-shaped pipe section, indicated generally by the reference numeral 57. The pipe section 54 has a construction as best shown in FIGS. 3 and 4. This section 57 is comprised of an inner tube 58 that has an opening 59 which communicates directly with the discharge end of the exhaust manifold 56. This inner pipe 58 is surrounded by an outer pipe that is comprised of a lower section 61 and an upper section 62 which are connected to each other through a flexible coupling 63 so as to permit expansion and contraction to accommodate for thermal variations. A water jacket 64 is formed between the inner and outer pipe sections 58, 61, and 62 and is held in water-tight relationship by the coupling 63.

The engine 38 is water cooled, and as is typical in this art, water for cooling purposes is drawn from the body of water in which the watercraft is operating in any known manner. For example, a portion of the water pumped by the jet propulsion unit 34 may be delivered to the engine cooling jacket. This water is then circulated through the engine, and either part of it is discharged to the cooling jacket 64 through a conduit 65 and inlet port 66 or this water may be delivered directly from the pump.

The outlet end of the C-shaped pipe section 57 is connected by a further elastic coupling 67 to a combined expansion chamber and catalytic converter device, indicated generally by the reference numeral 68. This device 68 is comprised of an inner shell 69 which defines an expansion chamber volume 71. This is connected by the coupling 67 to the inner pipe section 59 so as to receive the exhaust gases therefrom. An outer shell 72 is connected to the inner shell 69 by a header 73 and defines a cooling jacket 74 therearound. Water from the cooling jacket 64 of the C-shaped pipe section 57 is delivered to this cooling jacket 74.

In accordance with a feature of the invention, a catalyst bed, indicated generally by the reference numeral 75, is sandwiched in the expansion chamber 71 between the inner shell 69 and a further downstream inner shell 76. The catalyst bed 75 is comprised of an annular shell 77 that, in turn, receives a honeycomb-type catalyst bed 78 of a suitable catalytic material. The bed 78 may, for example, be designed primarily to treat hydrocarbons such as oil in the exhaust and render them harmless. An outer flange 79 supports the shell 77 and is maintained between the outer shell 72 and a further outer shell 81 that surrounds the inner pipe section 78. This inner pipe section 78 has a flange portion 82, with the flange 79 of the catalyst bed being maintained between the shell portions 69, 72, 76, and 78 by threaded fasteners 83.

The shells 76 and 81 define a further water jacket 84 that receives coolant from the cooling jacket 74 through a plurality of passages 85 formed in the catalyst bed flange portion 79.

From this construction it should be readily apparent that the catalyst bed 75 will pass all of the exhaust gases from the engine, and it will be maintained at a desired temperature. However, the cooling jackets 64, 74, and 84 will preclude the transmission of heat from the catalyst bed 75 and the exhaust gases from the remainder of the engine compartments.

It should be noted that the catalyst bed 75, and specifically the actual bed portion 78, is disposed above the water level line $L_w$, which is shown in FIG. 1, under all conditions of the watercraft. The line $L_w$ indicates the water level when traveling at low speed or being stationary. Thus, the catalyst bed 75 will be protected from water contamination by virtue of its height above the water level under all normal conditions of the watercraft 21.

The inner shell 78 is provided with a downwardly turned portion 86 that has a discharge opening 87, which in turn communicates with a flexible pipe section 88 so as to define a continuing water path 89 around this area. The section 88 terminates short of a corresponding part 91 of the outer shell 81 which is received within a flexible conduit 92. Hence, at this point and downstream of the catalyst bed 78 the cooling water from the cooling jackets will be introduced into the exhaust system.

Referring now primarily to FIGS. 1 and 2, the flexible conduit 92 extends rearwardly along one side of the aforenoted tunnel which appears partially in FIG. 2 and which is identified by the reference numeral 93. This conduit 92 is connected to the inlet section of a water trap device 94 that is disposed within the hull on one side of the tunnel 93, and particularly on one side of the jet propulsion unit 34. As is well known in this art, the water trap device 94 is sized so as to provide a sufficient volume to retain water and preclude it from flowing into the engine. In addition, internal baffles may be provided so as to provide water separation functions to offer still further water control.

An exhaust pipe 95 exits from the water trap device 94 and extends upwardly across the top of the tunnel 93 to a discharge end 96 that opens into the tunnel at an area that is close to or actually below the water level $L_w$.

In order to provide atmospheric air for the operation of the engine 38 and also to provide ventilation for the engine compartment and cooling of the exhaust system and catalyst bed 75, there is provided a ventilation system, which is shown in most detail in FIGS. 1 and 2. This ventilating system includes an atmospheric air inlet opening 97 which is provided in a concealed area under the deck 24 and which may be formed at the end of a water trap device that precludes water from being drawn into the engine compartment. The ventilating air inlet 97 is directed generally downwardly at the front of the fuel tank 51 so that air will be introduced into this area and flow rearwardly.

A discharge conduit 98 is provided at the rear portion of the engine compartment and has a forwardly facing opening 99 so that the air will flow through it and then be extracted to an area beneath the seat cushion 27. Hence, there will be a good flow of cooling and ventilating air, and this air flow will actually pass across the outer periphery of the exhaust system and the catalyst bed 75 so as to effectively cool it and offer further protection.

FIGS. 6–10 show another embodiment of the invention which is generally similar to the embodiment of FIG. 1. For that reason, numerous components of this embodiment have been identified by the same reference numerals as those applied in the previous description. Where those components are the same as those previously described, they will not be described again, except insofar as may be necessary to understand the construction and operation of this embodiment.

In this embodiment further details of the water trap device 94 are illustrated and will be described first. As has been previously noted, the water trap device 94 is designed so as to provide separation of the water from the exhaust gases and prevent reverse flow. As also has been noted, this is accomplished primarily by baffles in the water trap device 94 and by its internal volume. Two of these baffles appear in FIG. 6, and they are identified by the reference numeral 101. These basically comprise dividing walls within the interior of the water trap device 94 and which have nonaligned openings therein.

Referring now in more detail to the differences between this embodiment and that previously described, these deal with the location of the catalyst bed and its protection from water. In addition, this embodiment provides an arrangement whereby the catalyst bed may be washed with fresh water after the watercraft is taken out of service, and particularly when it has been operating in a marine environment.

In this embodiment the conduit 92 which connects the expansion chamber device 68 to the water trap device 94 is divided into a first conduit section 102 that extends forwardly from the bulkhead 33 and which communicates with the expansion chamber device 68 at its inlet end.

The outlet end of the first flexible conduit section 101 is received on the tubular outer shell 77 of the catalytic bed, indicated generally by the reference numeral 103 in this embodiment. The outlet end of this shell is connected to a further flexible conduit 104 which, in turn, delivers the exhaust gases to the water trap device 94. Thus, in this embodiment the catalyst bed 103, in addition to being positioned on the opposite side of the engine and specifically a vertical plane V at the forward end of the engine from the fuel tank 51, is more widely spaced from it.

This embodiment also shows that the catalytic device 103 may be positioned beneath a storage compartment 105 which is, in turn, disposed beneath the seat 27 and a removable rear section 106 thereof. This storage box 105 may be used for storage purposes, but in accordance with a feature of the invention, has a lower wall 107 that is pivotal so as to access the catalytic bed 103 for servicing and replacement. In addition, a flushing nozzle 108 is mounted on the outer shell 77, and a hose can be connected to this flushing section 108 through the aforenoted access path so as to introduce fresh water once the watercraft has been taken out of service and the catalytic bed 103 has cooled sufficiently. In this way the catalytic bed can be flushed with clear water, particularly after operation in a marine environment, so as to remove salt or other deposits which could foul the catalyst bed 103.

Figure 9:
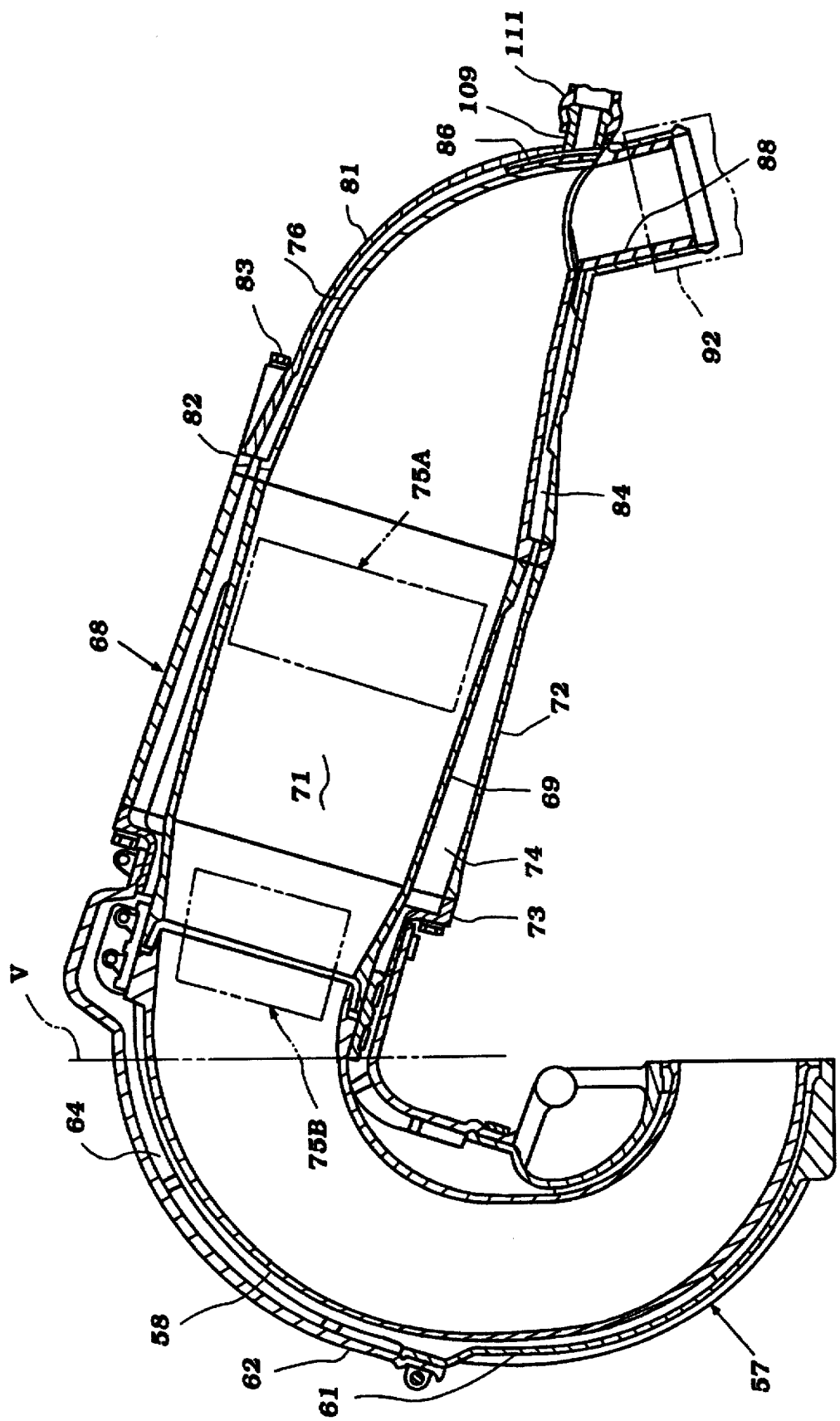
FIG. 9 is an enlarged cross-sectional view, in part similar to FIG. 4, and shows the expansion chamber device of this embodiment.
Figure 10:
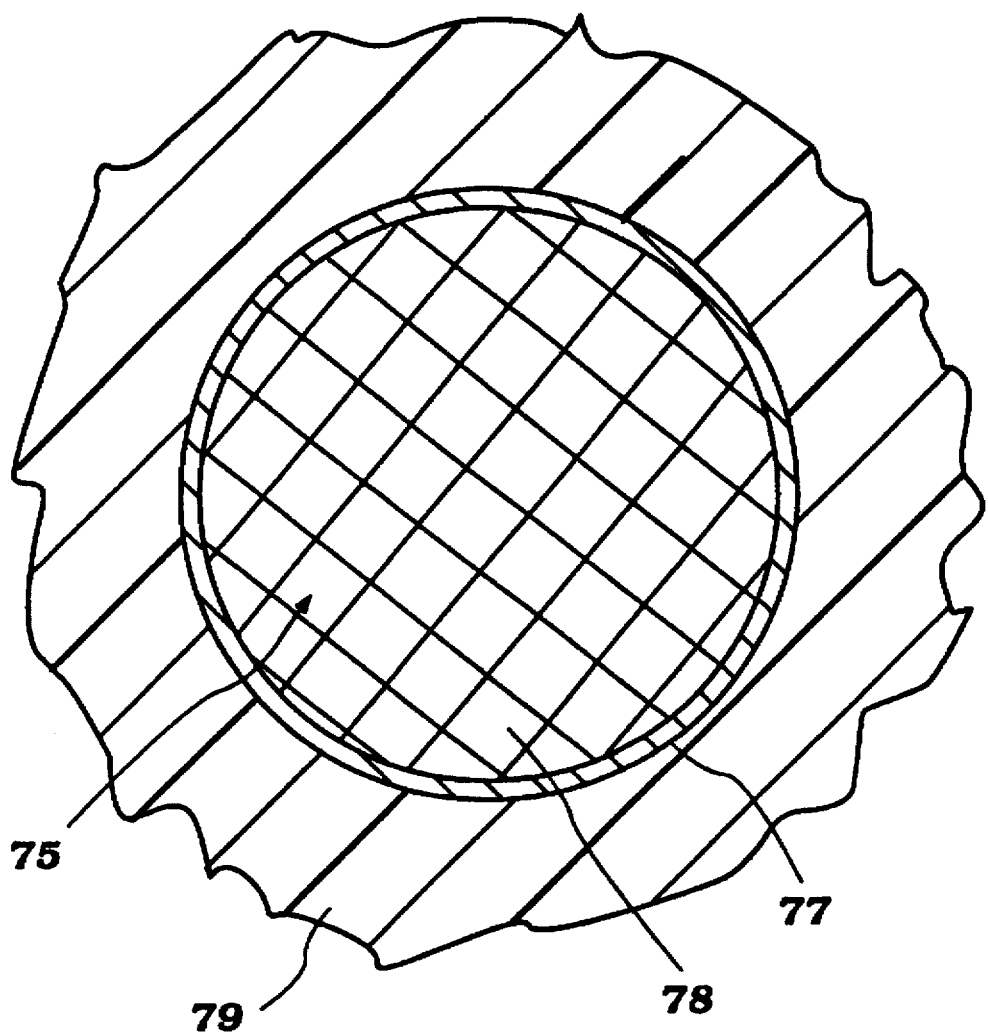
FIG. 10 is a further enlarged cross-sectional view taken along the line 10—10 of FIG. 6 and shows the catalyst bed and its support for this embodiment.

In addition to this distinction, still further protection is provided by the way in which the cooling water is returned to the exhaust gases, and this is shown best in FIGS. 9 and 10. Unlike the previous embodiment, the lower or downstream end of the cooling jacket 84 is closed, except for a drain nozzle 109 that is provided therein. A flexible conduit 111 connects this drain nozzle 109 to the water trap device 94 and at a position downstream of at least one of the baffles therein. Hence, water will be returned to the exhaust system well downstream of the catalyst bed 103, and further protection from contamination or damage is ensured.

Although FIGS. 6–10 show the catalyst bed 103 mounted in the bulkhead 33, it also can be mounted forwardly within the expansion chamber device 68, either in the location as shown in FIG. 4, in a forward location therefrom, as shown in phantom lines and wherein the catalyst bed is indicated by the reference numeral 75, or at the juncture between the C-pipe section 57 and the expansion chamber device 68, as also shown by the phantom-line view 75b in FIG. 9.

Figure 11:
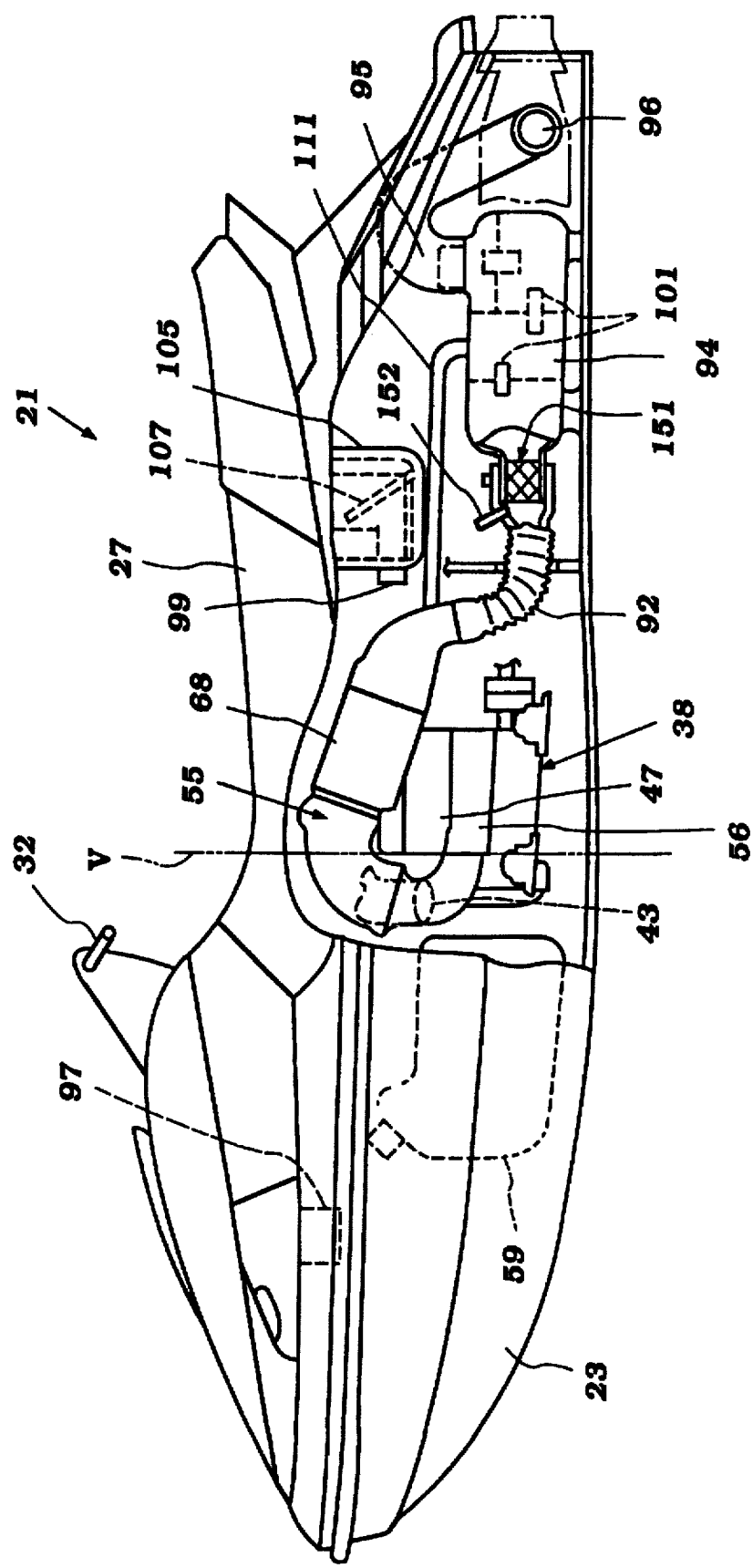
FIG. 11 is a side elevational view, with a portion broken away in part similar to FIGS. 1 and 6, and shows a third embodiment of the invention.

FIG. 11 shows another embodiment of the invention which is similar to the embodiment of FIGS. 6–10, but wherein the catalyst bed, indicated generally by the reference numeral 151, is positioned still further aft of the engine 38. In this embodiment the catalyst bed 151 is positioned in the inlet section of the water trap device 94. Thus, a flushing nozzle 152 may be provided forwardly of it, but still beneath the storage box 105, and specifically its pivoted lower wall 107 for water flushing after the catalyst bed 151 has cooled and after the watercraft has been operating in a hostile environment such as a marine environment.

Figure 12:
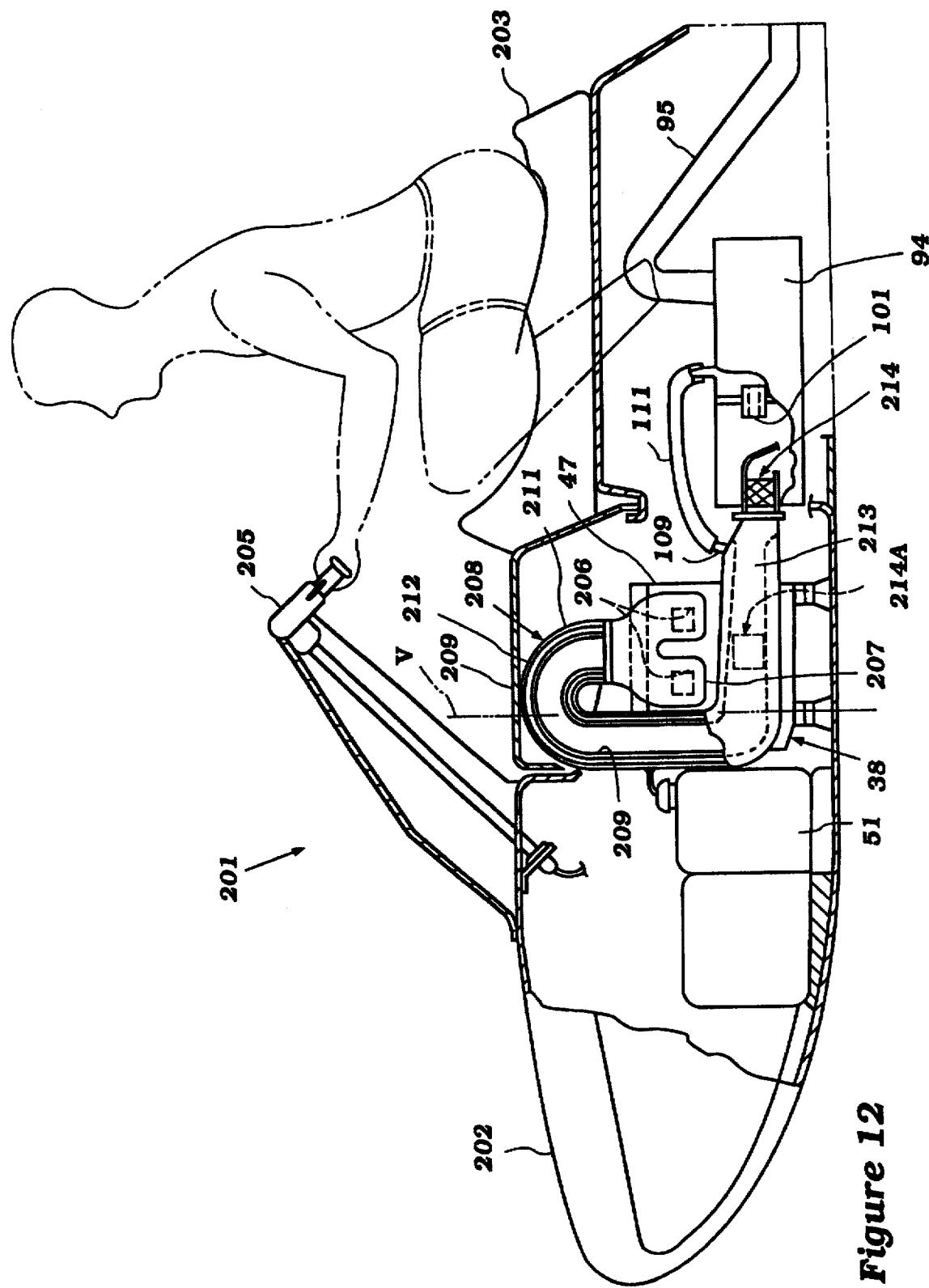
FIG. 12 is a side elevational view, with a portion broken away in part similar to FIGS. 1, 6, and 11, and shows a fourth embodiment of the invention.

A watercraft constructed in accordance with a further embodiment of the invention is illustrated in FIG. 12 and is indicated generally by the reference numeral 201. This watercraft differs from that previously described in that the hull 202 is configured so as to accommodate primarily only a single rider seated in straddle fashion on a rearwardly positioned seat 203.

Like the previously described embodiments, foot areas (not shown) are defined on opposite sides of the seat 203, and the foot areas open to the rear of the transom. In this embodiment an engine, which may have the same construction as those previously described, and thus is identified by the reference numeral 38, is disposed beneath an access panel 204 formed forwardly of the seat 203 but still in the rider's area. Hence, in this embodiment the engine 38 is not disposed beneath the seat, but still is disposed in the same general area, rearwardly of a fuel tank 51.

In this embodiment a slightly different control mast is employed, and this is identified by the reference numeral 205. The control mast 205 is connected to the steering nozzle for steering movement and also may provide other controls for the propulsion unit.

This embodiment shows the engine exhaust ports, and they are indicated generally by the reference numeral 206, and this may be the same construction as shown in the previously described embodiment which has not been illustrated there. That is, the illustration of the ports 206 in this figure may be considered the illustration of the exhaust ports of the engine in the previously described embodiments.

In this embodiment an exhaust manifold 207 collects the exhaust gases from the ports 206. However, they are delivered to an exhaust system, indicated generally by the reference numeral 208, in an upward direction. The exhaust system 208 is comprised of an inner pipe 209 that communicates with the exhaust passages of the manifold 207 and an outer pipe 211 that defines a cooling jacket 212 therebetween. Water may be delivered to this cooling jacket from the engine through the cooling jacket of the exhaust manifold 207 in a known manner.

It will be seen that the exhaust system 208 curves upwardly, forwardly, and then downwardly to a horizontally disposed expansion chamber section 213. A catalyst bed 214 is positioned in the discharge from this section 213 and which extends into the interior of the water trap device 94 which may have a construction as previously described.

The cooling jacket of the horizontal section 213 of the exhaust conduit 208 has a water discharge nipple 109 as previously described that communicates with a flexible conduit 111 for delivery of the cooling water to the water trap device 95, but rearwardly of its forwardmost baffle 101 so as to protect the catalyst bed 214.

Alternatively, the catalyst bed 214 may be positioned in the interior of the expansion chamber section 213, as shown by the phantom-line showing 214a.

In this embodiment the exhaust pipe 95 discharges rearwardly through the transom rather than into the tunnel. This arrangement may be utilized with the previous embodiment or vice versa. This embodiment also does not illustrate the ventilation system, but it may be of the type previously described so that the flow of ventilating air will pass across the catalyst bed 214.

Figure 13:
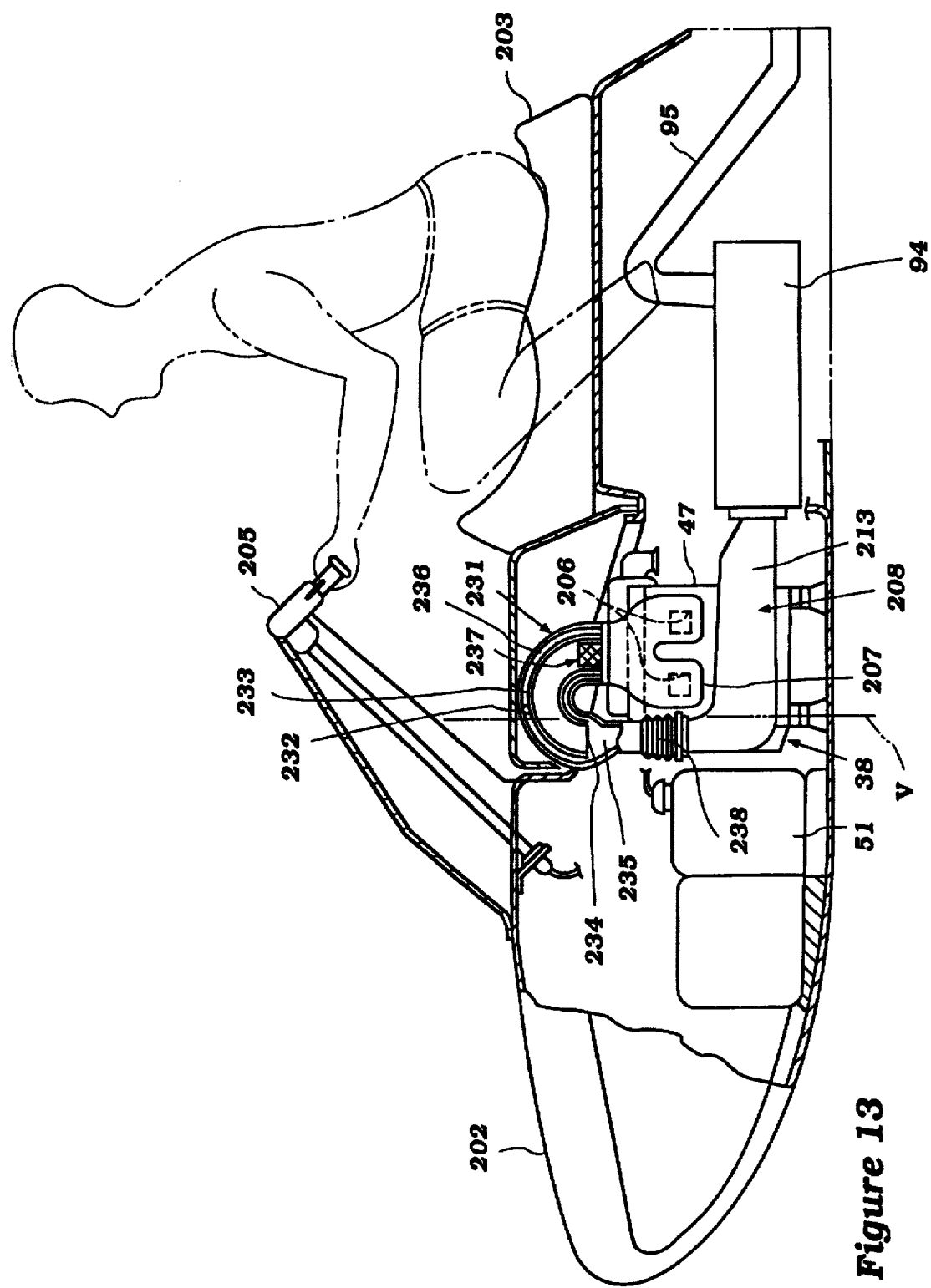
FIG. 13 is a side elevational view, with a portion broken away in part similar to FIGS. 1, 6, 11, and 12, and shows a fifth embodiment of the invention.

FIG. 13 shows another embodiment of the invention which is generally the same as the embodiment of FIG. 12, except for the position of the catalyst and the way the cooling water is returned to the exhaust system. For that reason, where components of this embodiment are the same as those of FIG. 12 or earlier embodiments, they are identified by the same reference numerals and will not be described again, except insofar as is necessary to understand the construction and operation of this embodiment.

In this embodiment a U-shaped pipe section, indicated generally by the reference numeral 231, receives the exhaust gases from the exhaust manifold 207. This includes an outer pipe portion 232 and an inner pipe section 233. It should be noted that the inner pipe section 233, which actually receives the exhaust gases, terminates at a discharge end 234 which is spaced from the outer section 232 so as to define an area 235. Cooling water contained within the cooling jacket 236 formed between the inner and outer sections 232 and 233 mixes with the exhaust gases in the area 235.

A catalyst bed 237 is positioned at the inlet of the pipe section 233, and thus is protected from the water by the trap-like effect of the U-shape of the pipes 233 and 236.

A flexible conduit 238 interconnects the outer end of the outer pipe 232 with the expansion chamber device 213, and in all other regards this embodiment is like those previously described. It should be noted that in this embodiment the catalyst bed 237 is positioned on the opposite side of the vertical plane V containing the front of the engine from the fuel tank 51 so as to provide the aforenoted heat protection.

Figure 14:
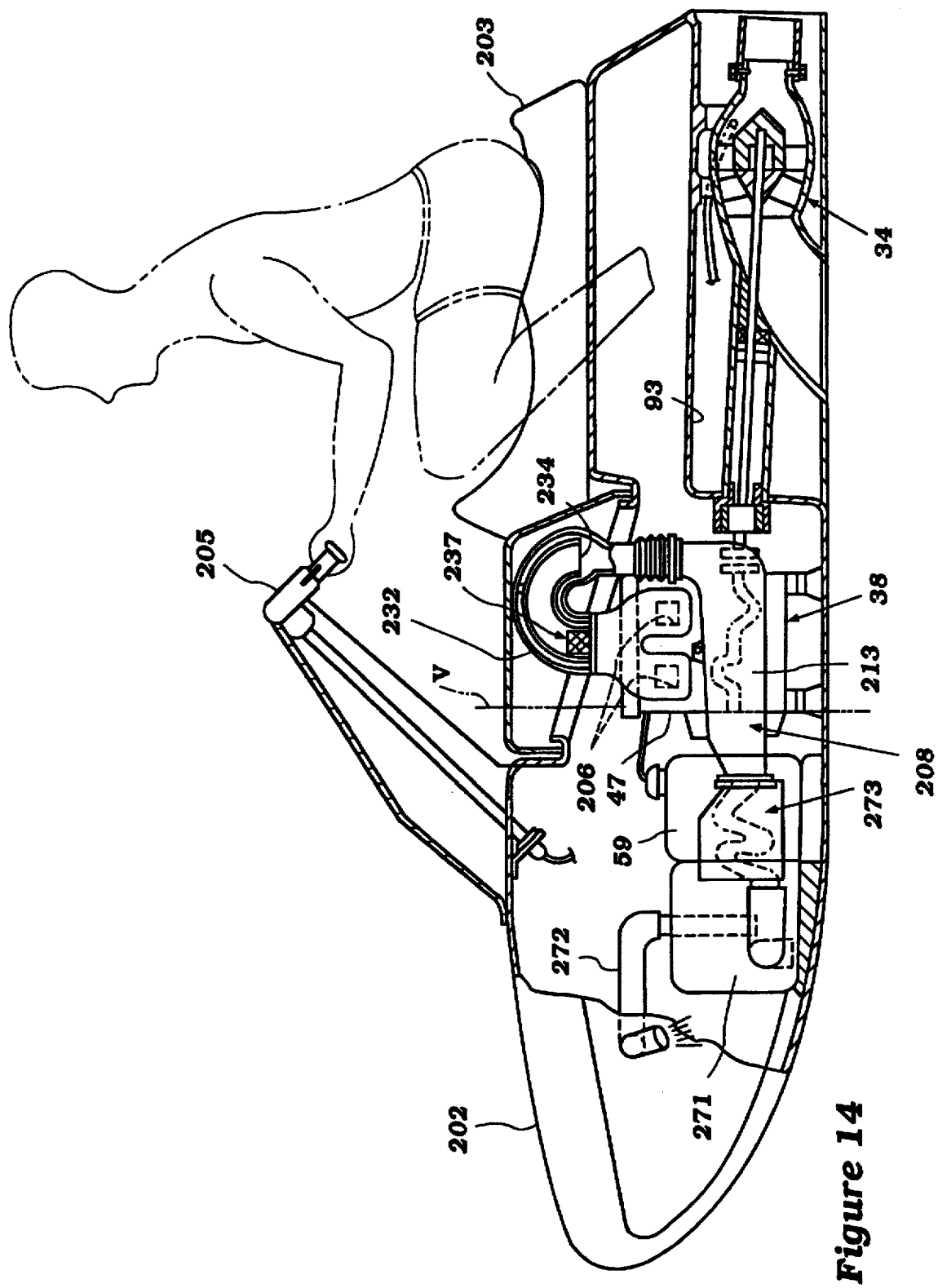
FIG. 14 is a side elevational view, with a portion broken away in part similar to FIGS. 1, 6, 11, 12, and 13, and shows a sixth embodiment of the invention.
Figure 15:
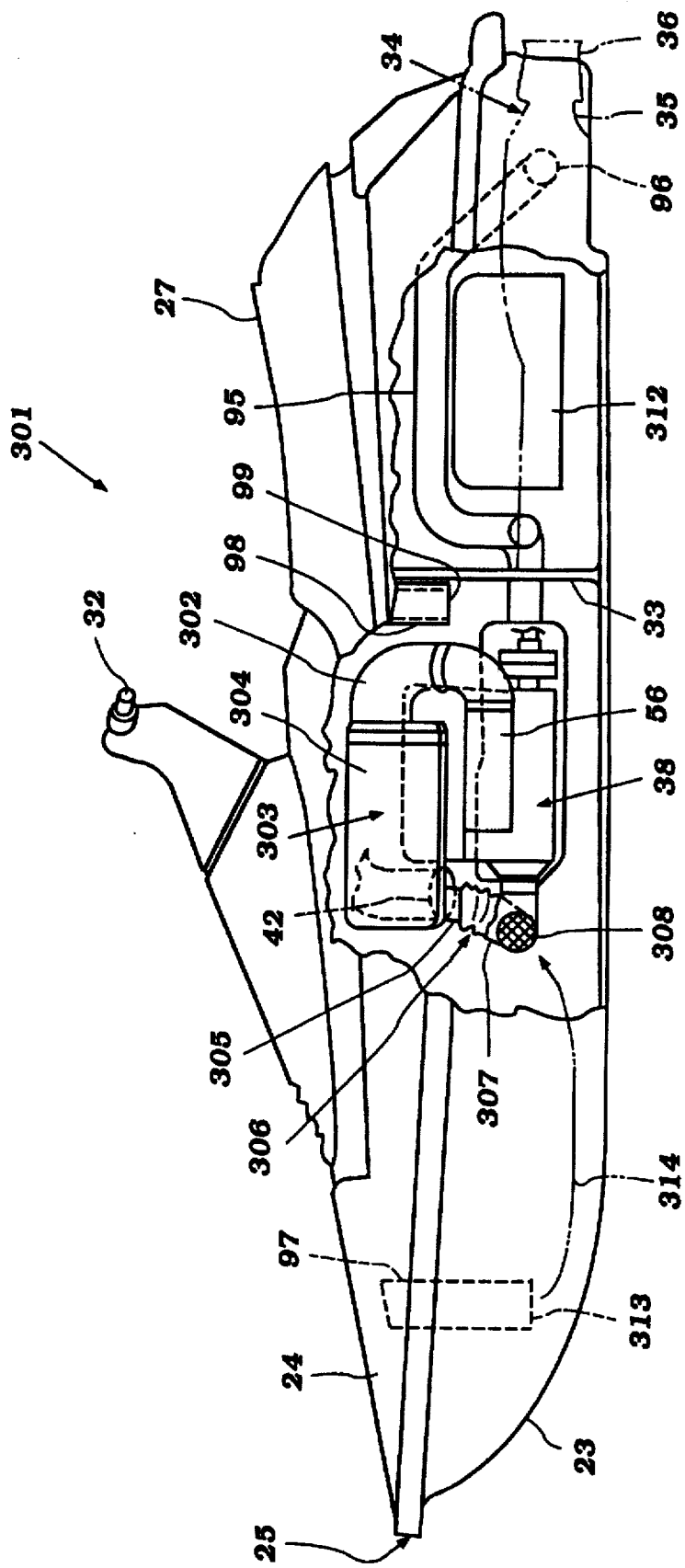
FIG. 15 is a side elevational view, with a portion broken away in part similar to FIGS. 1, 6, 11, 12, 13, and 14, and shows a seventh embodiment of the invention.
Figure 16:
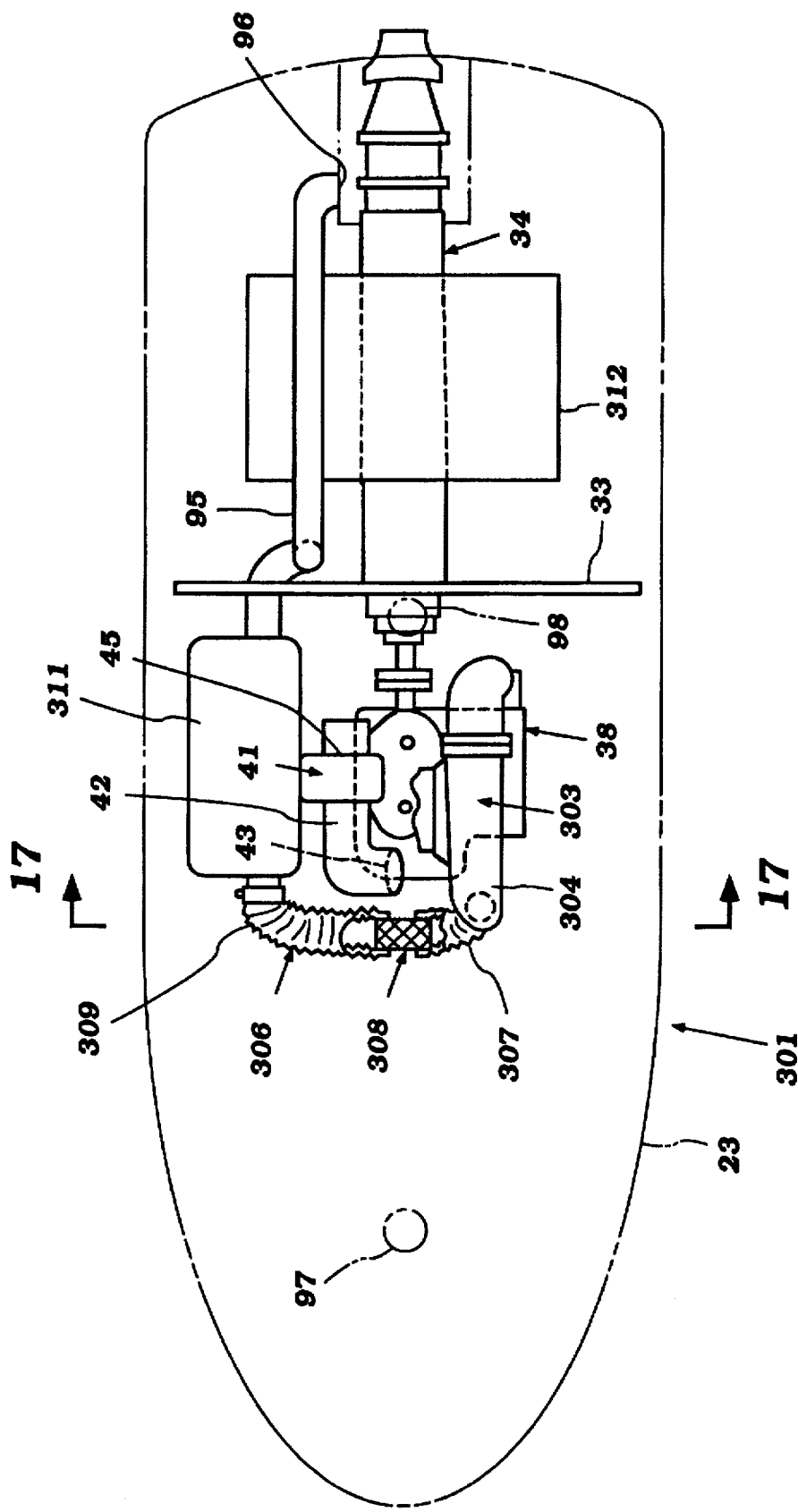
FIG. 16 is a top plan view, in part similar to FIGS. 2 and 7, showing this embodiment

FIG. 14 is a view of another embodiment which is similar to the embodiment of FIG. 13. However, in this embodiment the water trap device, indicated generally by the reference numeral 271, is positioned to the front of the fuel tank 59. Hence, the orientation of the U-shaped pipe section 232–233 is reversed, and the expansion chamber device 213 extends forwardly rather than rearwardly.

In this embodiment an exhaust pipe 272 discharges the exhaust gases from the water trap device 271 to the atmosphere through the side of the hull 202. In addition, a further water trap device 273 is interposed between the expansion chamber device 213 and the water trap device 271, which has a double trap section, as shown in phantom lines.

In many of the embodiments described, the catalytic bed is disposed at a relatively high level so that it will be above the water level when the watercraft with which it is associated is in the normal position in the water, yet either at cruise or under idle conditions. Next will be described an embodiment wherein some of the advantages previously described are enjoyed and, furthermore, wherein the catalytic bed is positioned so that regardless of how the watercraft may be in the water, whether erect, inverted, partially or fully capsized, it will be above the water level.

This embodiment is shown in FIGS. 15–18, and the watercraft generally has the same configuration of that of FIGS. 1–5. For that reason, components which are the same including those of the basic watercraft, have been identified by the same reference numerals and will be described again only insofar as is necessary to understand the construction and operation of this embodiment.

It should be noted that the watercraft constructed in accordance with this embodiment, which is indicated generally by the reference numeral 301, has an exterior configuration that is similar to but not identical to that of the embodiment of FIGS. 1–6. However, the general layout of the components is the same, and for that reason they have been identified by the same reference numerals where they function to provide the same general purpose. This, however, further points out how the invention is not limited to the particular external shape of the watercraft, even though it has certain advantages in conjunction with the configurations which have been described.

In this embodiment the engine exhaust manifold 56 has a rearwardly facing discharge opening. This communicates with a reverse C-shaped section 302 that conveys the exhaust gases upwardly and forms a portion of an exhaust system, indicated generally by the reference numeral 303. This exhaust system 303 includes an expansion chamber device 304 that is disposed at a relatively high location in the hull and along one side of the engine. At its forward end the expansion chamber device 303 has a downwardly facing outlet fitting 305 to which a catalytic converter assembly, indicated generally by the reference numeral 306, is connected by means of a first flexible conduit 307. The conduit 307 delivers the exhaust gases to a horizontally disposed, transversely extending catalyst bed 308 which may be of any known type, depending upon the treatment which it is intended to provide. A further flexible conduit 309 extends from the discharge end of the catalyst 308 to a water trap device 311 which is disposed on the side of the engine 38 opposite the expansion chamber device 303. Hence, the side-to-side balance of the watercraft is maintained with this arrangement.

The exhaust pipe 95 extends from the water trap device 311 along one side of the jet propulsion unit 34 to the discharge opening 96 in the tunnel, as aforedescribed.

Since the catalyst 308 is positioned to the front of the watercraft 301, a saddle-type fuel tank 312 is provided in the area beneath the seat 27 and foot areas and which supplies fuel to the engine. Hence, the positions of the catalyst bed 308 and fuel tank 312 are reverse from most of the embodiments previously described. In any event, however, there is obtained maximum spacing between these components so that there will be no heat transfer therebetween.

In addition, it should be noted that the vent pipe 97 that admits the ventilating air to the engine compartment in this embodiment is extended, as at 313, so as to deliver the ventilating air at a low area so that it can flow rearwardly as shown by the phantom arrow 314 to flow across the catalyst bed 308 and cool it. Hence, this embodiment also provides good cooling for the catalyst and ensures that the heat from it will not contact or heat other critical elements of the system.

Figure 18:
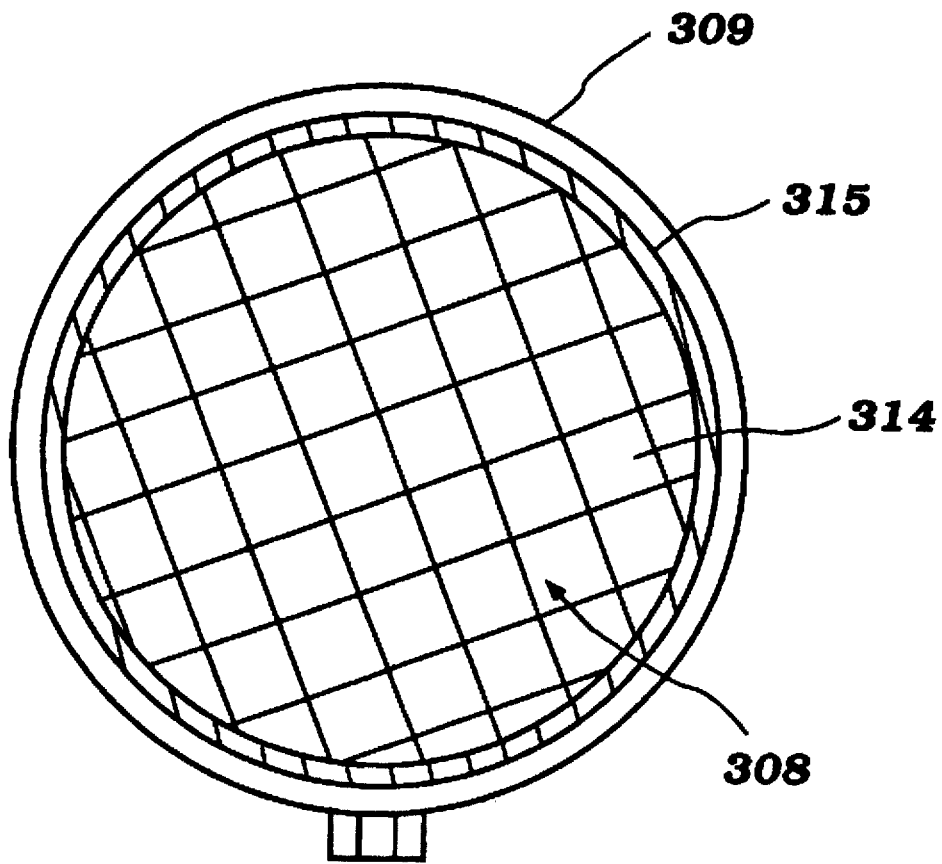
FIG. 18 is an enlarged cross-sectional view taken along the line 18—18 and shows the catalyst bed support for this embodiment.

As seen in FIG. 18, the catalyst bed 308 is comprised of the bed portion itself, indicated generally by the reference numeral 314, that has a tubular outer shell 315 to which the flexible conduits 307 and 309 are connected by a slip fit.

Figure 17:
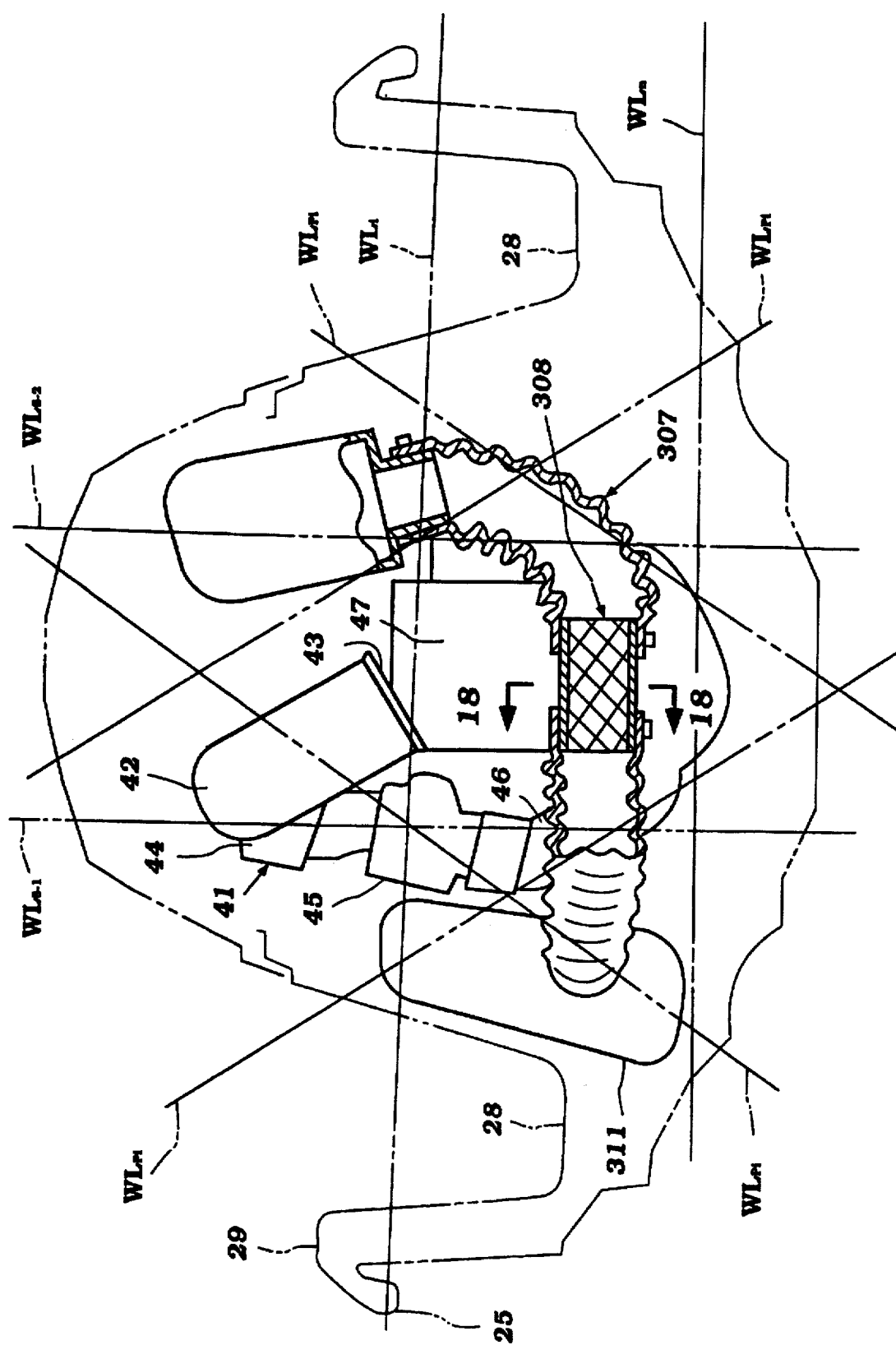
FIG. 17 is an enlarged cross-sectional view, in part similar to FIGS. 3 and 8 but taken along the line 17—17 of FIG. 16, for this embodiment.

Referring now to FIG. 17, it will be described how the catalyst bed 308 is positioned so that it will be protected from contact with water, regardless of what orientation the watercraft 301 may be forced into. In the position of the normal watercraft operation when planing or when operating at a relatively low speed, the catalyst bed 308 is disposed above the water level $WL_n$, as clearly shown in this figure. Also, if the watercraft is inverted so that the water level is in the condition $WL_i$, it will be seen that the bed 308 is again above the water level.

If the watercraft is forced over on one side and held in this condition, as shown in the phantom line $WL_{s-1}$, the bed 308 will be above the water level. In a like manner, if tilted over onto the other side, as shown at $WL_{s-2}$, the bed 308 is still above the water level.

If the water level is in intermediate positions from either side, as shown by the remaining lines $WL_{pi}$, in any condition, the catalyst bed is still protected. Therefore, this embodiment is very effective in ensuring that regardless of what attitude the watercraft is in, water can never reach the catalyst bed because it will always be above the water level.

Figure 19:
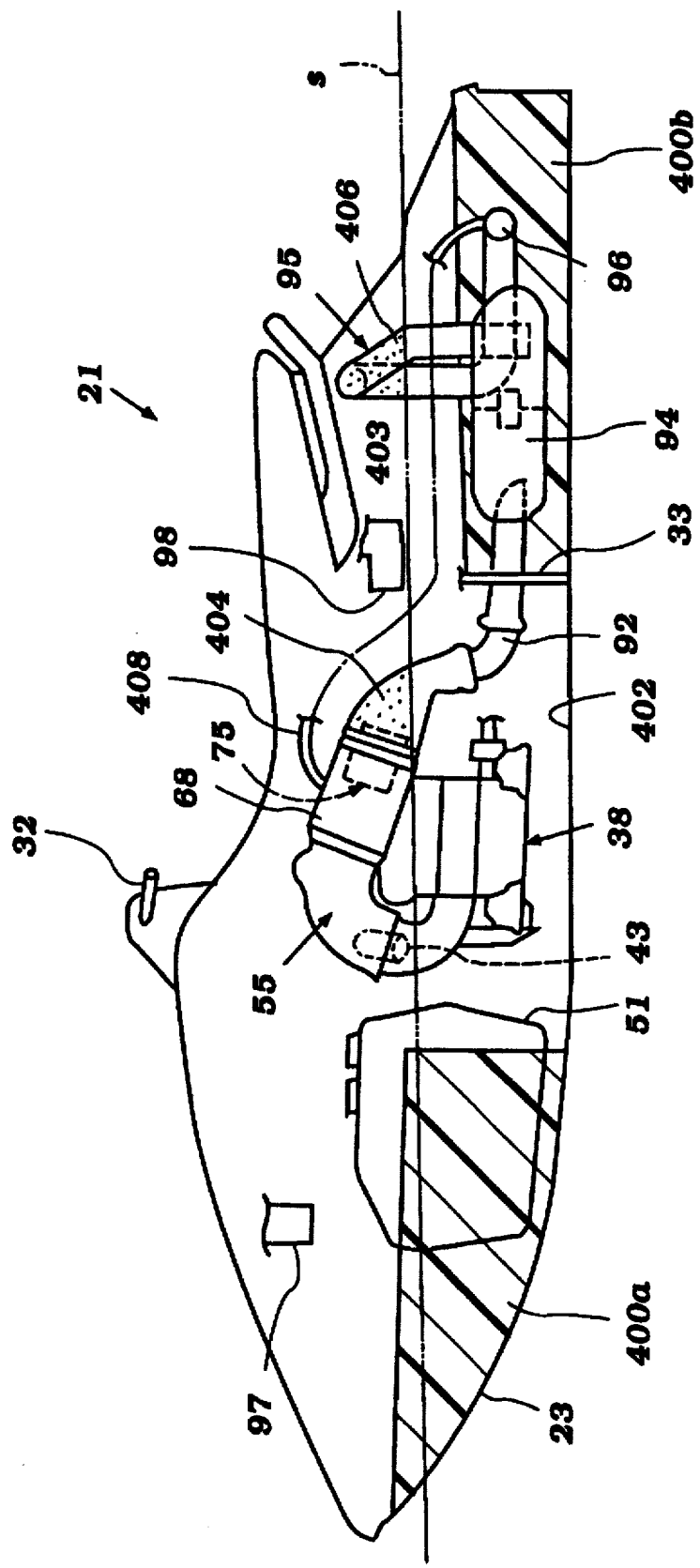
FIG. 19 is a side elevational view, with a portion broken away in part similar to FIGS. 1, 6, and 11–15, and shows an eighth embodiment of the invention.
Figure 20:
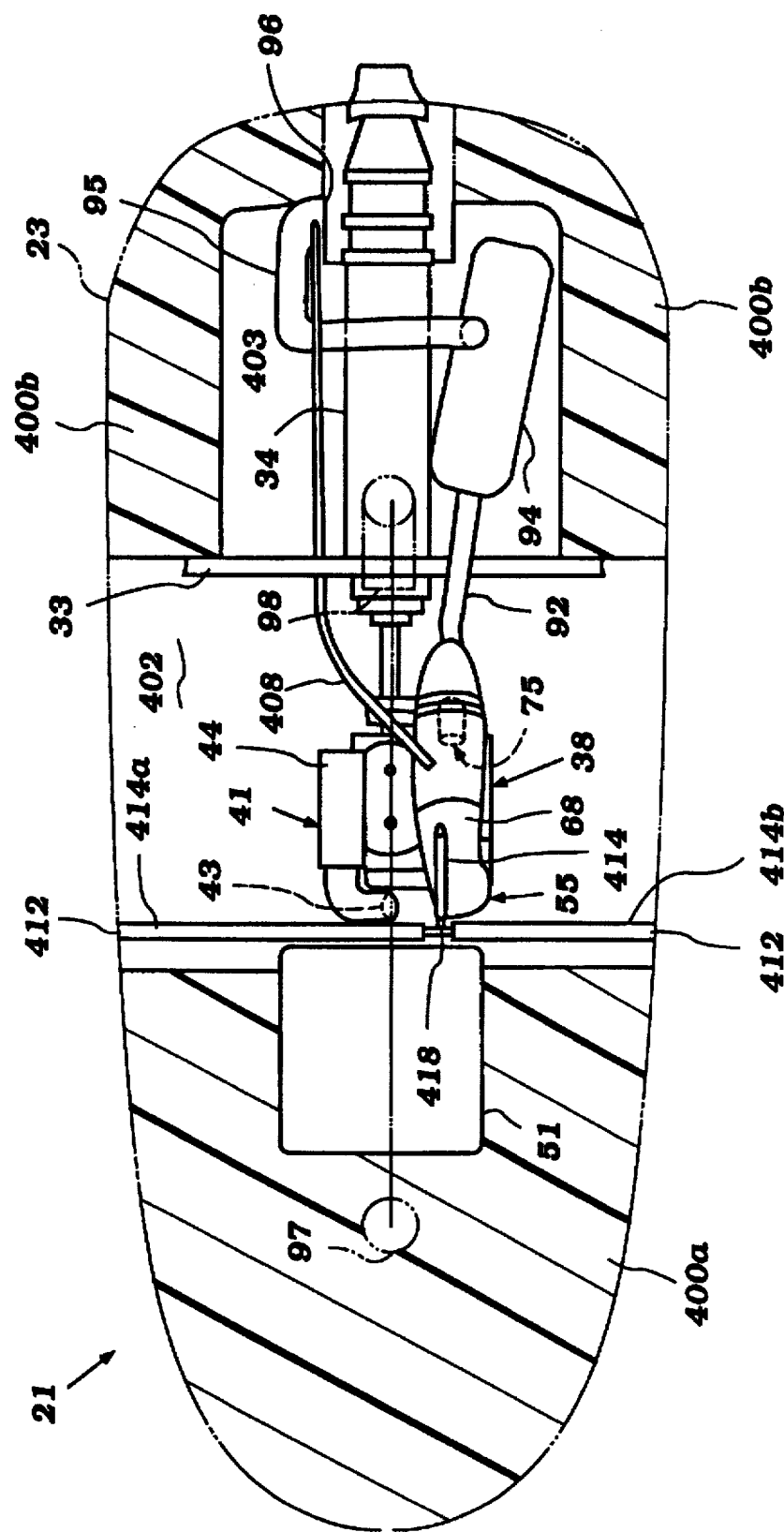
FIG. 20 is a top plan view, in part similar to FIGS. 2, 7 and 16, showing this embodiment.
Figure 21:
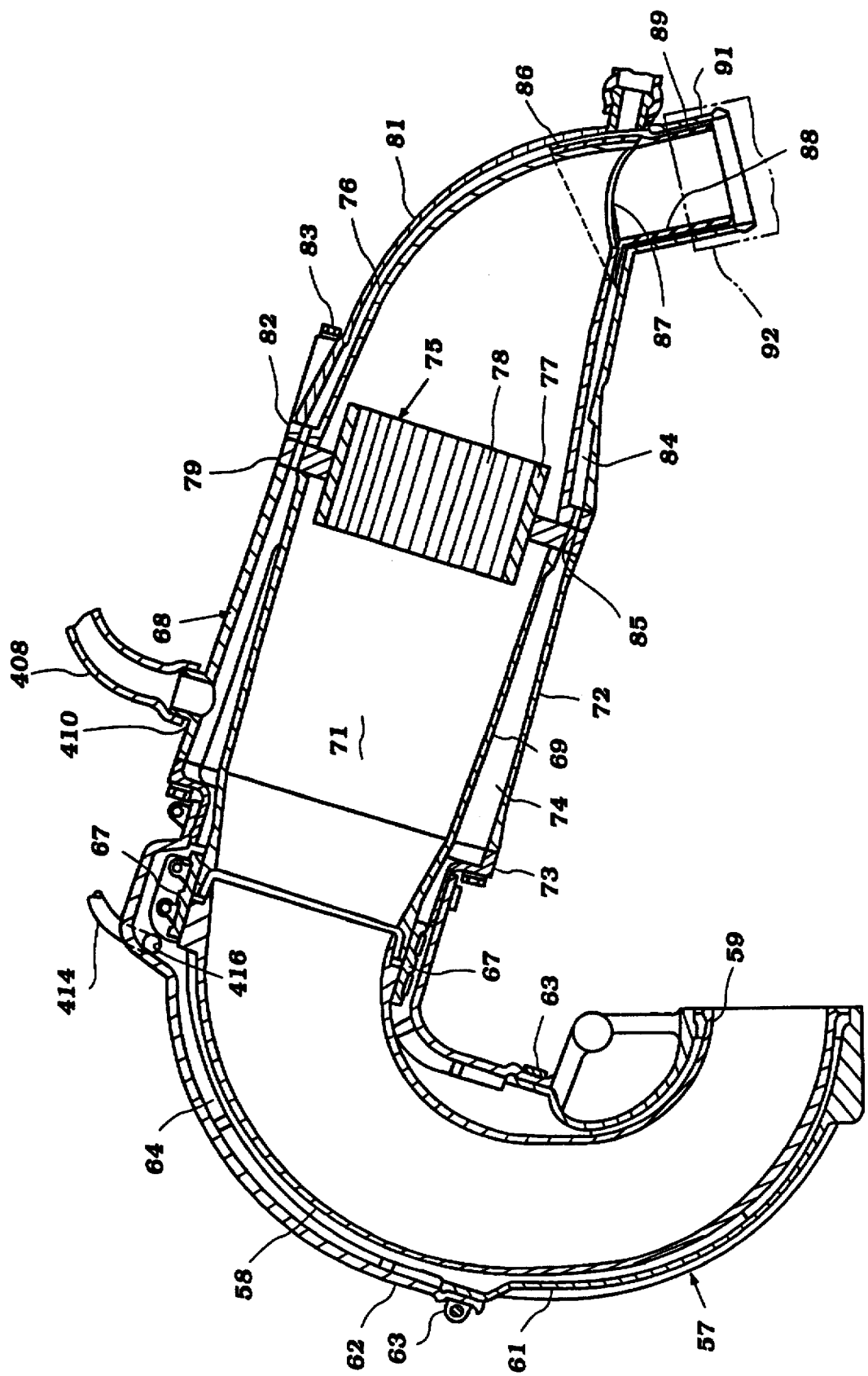
FIG. 21 is an enlarged cross-sectional view taken through the exhaust expansion chamber device of this embodiment.

FIGS. 19–21 illustrate an additional embodiment of the present personal watercraft which is generally similar to the embodiment of FIG. 1. For that reason, numerous components of this embodiment have been identified by the same reference numerals as those applied in the previous description. Where those components are the same as those previously described, they will not be described again, except insofar as it may be necessary to understand the construction and operation of this embodiment.

With reference to FIGS. 19 and 20, the watercraft includes a plurality of floatations 400 positioned within the hull. The floatations 400 are ranged to define an engine compartment 402 positioned generally at the longitudinal center of the watercraft 21 and forward of the bulkhead 33. As schematically represented in FIG. 19, the floatations 400 are sized and selected to maintain the watercraft a float even when the engine compartment 402 is filled with water. Line S indicates the water level when the watercraft 21 is at rest, the engine compartment 402 is filled with water and no rider is on the watercraft 21. In the illustrated embodiment, as seen in FIG. 19, the water level S lies just below the downwardly facing air inlet opening 43 of the induction system 41 with the engine compartment 402 filled with water.

A front floatation 400a defines a cavity in which a portion of the fuel tank 51 lies. As best understood from FIG. 20, the fuel tank 51 lies generally about the longitudinal center line of the watercraft 21 and forward of the engine 38.

Rear floatations 400b lie on either side of the jet propulsion unit 34. A pump chamber 403 is formed between the floatations 400b. The pump chamber 403 houses various components, including the water trap 94, the jet propulsion unit 34 and the exhaust pipe 95.

With reference to FIG. 19, the exhaust system 55 desirably is configured such that at least two portions of the exhaust system 55 downstream of the catalyst bed 75 lie above water level S. The dotted sections of FIG. 19 identify these sections in the illustrated embodiment; however, the exhaust system 55 can be configured to place these sections at other locations within the exhaust system 55. The sections of the exhaust system 55 above line S trap air and prevent an influx of water through the exhaust system 55 up into the expansion chamber and catalytic converter device 68 which houses the catalyst bed 75. In this manner, these elevated sections of the exhaust system 55 protect the catalyst bed 75 from contamination.

In the illustrated embodiment, a first elevated section 404 of the exhaust system 55 is formed directly downstream of the catalyst bed 75. As best seen in FIG. 21, the first elevated section 404 lies in the downstream section of the expansion chamber volume 71, just upstream of the downwardly turned portion 86 of the expansion chamber and catalytic converter device 68.

The section elevated section 406 of the exhaust system 55 is formed in the exhaust pipe 95. As best seen in FIGS. 19 and 20, the exhaust pipe 95 extends from the water trap 94 upwardly across the top of the tunnel 93 to a discharge end 96 that opens into the tunnel 93. The upper section 406 of the exhaust pipe 95, which extends across the tunnel 93 desirably lies above the water level S when the engine compartment 402 is filled with water to this level.

The catalyst bed 75 desirably is positioned within the exhaust system 55 such that at least an upper portion of the catalyst lies above the water level S with no rider on the watercraft 21. In the illustrated embodiment, as seen in FIG. 19, the entire catalyst bed 75 lies above water level S. The catalyst bed 75, however, can be positioned such that with a rider on the watercraft 21, the entire catalyst bed 75 lies below the water level.

The present watercraft also includes a discharge conduit 408 which delivers coolant (e.g., water) from the cooling jacket 74 to a portion of the exhaust system 55 downstream of the catalyst bed 75. In the illustrated embodiment, the discharge conduit 408 desirably communicates with the exhaust system 55 at a point downstream of the upper section 406 of the exhaust pipe 95.

With reference to FIG. 21, the discharge conduit 408 communicates with the cooling jacket 74 through a first outlet port 410. The outlet port 410 is defined on the outer shell 72 of the expansion chamber and catalytic converter 68. The outlet port 410 desirably lies upstream of the catalyst bed 75. At this position, at least a portion of the coolant flowing through the water jacket 74 flows into the discharge conduit 408. The outlet port 410 and discharge conduit 408 desirably define a flow passage which is larger than the flow passage through the cooling jacket 84 and water path 89 downstream of the catalyst bed 75. In this manner, a substantial portion of the coolant will be discharge through the discharge conduit 408 rather than flowing through the water jacket 84. This allows the catalyst bed 75 to maintain a relatively high operating temperature, yet transfer some heat so as not to heat above a desired operating temperature. The reduced amount of water flow through the cooling jacket 74 downstream of the outlet port 410 also presents less risk of reverse flow back into the expansion chamber volume 74 when the watercraft 21 is capsized or turned on its side.

With reference to FIG. 20, the present cooling system also includes at least one and preferably two telltale ports 412 positioned on opposite sides of the watercraft 21. In the illustrated embodiment, these ports 412 are positioned on opposing sides of the starboard and port sides of the watercraft 21. Other positions of the ports 412, of course, are possible. A delivery conduit 414 connects the telltale ports 412 to the cooling jacket 64. For this purpose, as seen in FIG. 21, the upper section 62 of the outer C-shaped pipe section 57 includes an outlet port 416. In this position, the second outlet port 416 lies upstream of the first outlet port 410 and of the catalyst bed 4=75. The delivery conduit 414 connects to the outlet port 416 and, as seen in FIG. 20, extends to a T-connection 418 at a point forward of the engine 38. Sections 414a, 414b of the delivery tube 414 connect the T-connection 418 to the corresponding telltale ports 412. As best understood from FIG. 21, the flow capacity of the second port 416 and the delivery conduit 414 which communicate with the telltale ports 412 is substantially less than the discharge conduit 408 such that a small amount of water will be diverted through the delivery conduit 414 to the telltale ports 412. In this manner, an operator of the watercraft 21 can visually determine that the engine cooling system is functioning properly.

From the foregoing description it should be readily apparent that the preferred embodiments of the invention as described are very effective in providing good catalytic exhaust treatment for a small watercraft such as a personal watercraft and protection, regardless of what extreme conditions may be encountered. In addition and in spite of the small physical nature of these watercraft, the heat from the converter is maintained away from critical components such as the fuel tank. In addition, some embodiments permit flushing of the converter easily so as to clear it of salt water, and in all embodiments water protection is provided in a variety of manners under a variety of conditions. Of course, the foregoing description is that of preferred embodiments of the invention, and various changes and modifications may be made without departing from the spirit and scope of the invention, as defined by the appended claims.

What is claimed is:

1. A personal watercraft comprising a hull defining a rider's area sized to accommodate at least one rider, said hull defining an engine compartment containing an internal combustion engine having at least one exhaust port and an output shaft, a propulsion device carried by said hull and driven by said engine output shaft, an exhaust system communicating with said engine exhaust port and delivering exhaust gases to the atmosphere, a cooling jacket juxtaposing at least a portion of said exhaust system and communicating with a cooling system of said engine such that coolant flows between said engine cooling system and said cooling jacket, and a catalyzer in said exhaust system having a catalyst bed which treats the exhaust gases before discharge to the atmosphere, said cooling jacket communicating with a first outlet port positioned upstream of said catalyzer such that at least a portion of coolant flow through said cooling jacket flows through said first outlet port.

2. A personal watercraft as in claim 1, wherein at least a portion of said cooling jacket surrounds at least a portion of said catalyzer and extends downstream of the catalyst bed of said catalyzer.

3. A personal watercraft as in claim 2, wherein at least a portion of the coolant flow merges with the exhaust gas flow through said exhaust system at a point downstream of said catalyst bed.

4. A personal watercraft as in claim 1 additionally comprising a second port communicating with said cooling jacket upstream of the catalyst bed of said catalyzer such that a portion of coolant flow through said cooling jacket flows into said second outlet port.

5. A personal watercraft as in claim 4 additionally comprising a coolant discharge conduit which communicates with said exhaust system downstream of said catalyzer and one of said first and second outlet ports to discharge at least a portion of the coolant from said cooling jacket.

6. A personal watercraft as in claim 5, wherein said engine is water cooled and said discharge conduit communicates with a discharge end of said exhaust system to return the coolant water to the body of water in which the watercraft is operated.

7. A personal watercraft as in claim 6, wherein said exhaust system and said discharge conduit discharge into a tunnel formed on the underside of said hull on the opposite side of said tunnel form said catalyzer.

8. A personal watercraft as in claim 1 additionally comprising a first telltale port positioned on a side of said hull and communicating with one of said first and second outlet ports.

9. A personal watercraft as in claim 1 additionally comprising a second telltale port positioned on a side of said hull opposite that of said first telltale port and communicating with one of said first and second outlet ports.

10. A personal watercraft as in claim 1, wherein a T-shaped conduit connects said first and second telltale ports to the same one of said of first and second outlet ports communicating with said water jacket.

11. A personal watercraft as in claim 1, wherein the propulsion device comprises a jet propulsion unit.

12. A personal watercraft as in claim 1, wherein said exhaust system comprises a water trap positioned between said catalyzer and a discharge end of said exhaust system.

13. A personal watercraft as in claim 1 additionally comprising a coolant discharge conduit which communicates with said exhaust system downstream of said water trap and with said first outlet port to discharge at least a portion of the coolant from said cooling jacket.

14. A personal watercraft as in claim 13, wherein the catalyst bed is disposed above the engine.

15. A personal watercraft having a hull defining a rider's area sized to accommodate at least one rider, said hull defining an engine compartment between a plurality of floatations, said engine compartment containing an internal combustion engine having at least one exhaust port and an output shaft, a propulsion device carried by said hull and driven by said engine output shaft for propelling said watercraft, an exhaust system communicating with said engine exhaust port to convey exhaust gases to the atmosphere, and a catalyst in said exhaust system to treat the exhaust gases before discharge, at least an upper portion of said catalyst being position within said hull so as to be above a water level with said engine compartment generally filled with water from the body of water in which the watercraft is operated.

16. A personal watercraft as in claim 15, wherein said exhaust system is configured such that with said engine compartment being generally filled with water, at least two portions of said exhaust system downstream of said catalyst lie above a water line of the body of water in which the watercraft is operated.

17. A personal watercraft as in claim 16, wherein one of said portions lies directly downstream of said catalyst.

18. A personal watercraft as in claim 15, wherein said exhaust system discharges into a tunnel formed on the underside of said hull on an opposite side of said tunnel from said catalyst, and includes an exhaust pipe which extends over the top of said tunnel, said exhaust pipe being positioned such that an upper portion of said exhaust pipe acts as one of said portions of said exhaust system which lie above said water line with said engine compartment generally filled with water.

19. A personal watercraft as in claim 15, wherein said flotations are positioned at least at fore and aft ends of said hull.

20. A personal watercraft as in claim 19, wherein said exhaust system discharges into a tunnel formed on the underside of said hull, and at least of two of said floatations are arranged to extend along the length of said tunnel on port and starboard sides of said hull.

21. A personal watercraft as in claim 15 additionally comprising a cooling jacket juxtaposing a portion of said exhaust system, said cooling jacket communicating with a cooling system of said engine to receive a coolant flow flowing through said cooling system.

22. A personal watercraft as in claim 21, wherein said cooling jacket encircles at least a portion of said catalyst and communicates with a first outlet port positioned upstream of said catalyst.

23. A personal watercraft as in claim 22 additionally comprising a discharge conduit which delivers coolant from said cooling jacket to said exhaust system downstream of said catalyst.

24. A personal watercraft as in claim 23, wherein said discharge conduit communicates with said exhaust system at a point downstream of the location of said two portions of said exhaust system which lie above the water line with the engine compartment generally filled with water.

* * * * *